United States Patent
Calley et al.

(10) Patent No.: US 8,952,590 B2
(45) Date of Patent: Feb. 10, 2015

(54) TRANSVERSE AND/OR COMMUTATED FLUX SYSTEMS HAVING LAMINATED AND POWDERED METAL PORTIONS

(75) Inventors: David G. Calley, Flagstaff, AZ (US); Daniel S. Cole, Flagstaff, AZ (US); John M. Dyer, Flagstaff, AZ (US); Thomas F. Janecek, Flagstaff, AZ (US); Tyler K. Williams, Flagstaff, AZ (US)

(73) Assignee: Electric Torque Machines Inc, Flagstaff, AZ (US)

( * ) Notice: Subject to any disclaimer, the term of this patent is extended or adjusted under 35 U.S.C. 154(b) by 227 days.

(21) Appl. No.: 13/291,392

(22) Filed: Nov. 8, 2011

(65) Prior Publication Data

US 2012/0119599 A1   May 17, 2012

Related U.S. Application Data

(60) Provisional application No. 61/414,769, filed on Nov. 17, 2010, provisional application No. 61/414,774, filed on Nov. 17, 2010, provisional application No. 61/414,781, filed on Nov. 17, 2010, provisional application No. 61/453,075, filed on Mar. 15, 2011.

(51) Int. Cl.
   *H02K 1/06* (2006.01)

(52) U.S. Cl.
   USPC .............................. 310/216.086; 310/216.008

(58) Field of Classification Search
   USPC .................... 310/216.051, 216.086, 216.093,
       310/216.109, 216.008, 216.061, 44, 156.02,
           310/216.006, 216.007, 216.004, 216.033
   See application file for complete search history.

(56) References Cited

U.S. PATENT DOCUMENTS

| | | | |
|---|---|---|---|
| 1,361,136 A | | 12/1920 | Burke |
| 1,783,527 A | * | 12/1930 | Sundhaussen ................ 318/141 |
| 1,809,197 A | | 6/1931 | Fendrich, Jr. |
| 2,078,668 A | | 4/1937 | Kilgore |
| 2,122,307 A | | 6/1938 | Welch |
| 3,403,273 A | | 9/1968 | Higuchi |
| 3,437,854 A | | 4/1969 | Oiso |
| 3,558,941 A | | 1/1971 | Visconti Brebbia et al. |
| 3,700,942 A | | 10/1972 | Alth |
| 3,710,158 A | | 1/1973 | Bachle et al. |
| 3,774,059 A | | 11/1973 | Cox |
| 3,869,625 A | | 3/1975 | Sawyer |

(Continued)

FOREIGN PATENT DOCUMENTS

| | | |
|---|---|---|
| DE | 1513856 | 4/1969 |
| DE | 3626149 | 8/1986 |

(Continued)

OTHER PUBLICATIONS

Notice of Allowance dated Mar. 29, 2005 for U.S. Appl. No. 10/721,765.

(Continued)

*Primary Examiner* — Hanh Nguyen
(74) *Attorney, Agent, or Firm* — Invention To Patent Services; Alex R Hobson

(57) ABSTRACT

Electrical machines, for example transverse flux machines and/or commutated flux machines, may be configured to achieve increased efficiency, increased output torque, and/or reduced operating losses via use of laminated materials in connection with powdered metal materials. For example, stacks of laminated materials may be coupled to powdered metal teeth to form portions of a stator in an electrical machine.

15 Claims, 32 Drawing Sheets

(56) References Cited

U.S. PATENT DOCUMENTS

| | | |
|---|---|---|
| 3,984,711 A | 10/1976 | Kordik |
| 3,999,107 A | 12/1976 | Reuting |
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,237,397 A | 12/1980 | Mohr et al. |
| 4,255,684 A | 3/1981 | Mischler et al. |
| 4,255,696 A | 3/1981 | Field, II |
| 4,286,180 A | 8/1981 | Langley |
| 4,306,164 A | 12/1981 | Itoh et al. |
| 4,339,875 A | 7/1982 | Muller |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,508,984 A | 4/1985 | Guedj |
| 4,605,874 A | 8/1986 | Whiteley |
| 4,611,139 A | 9/1986 | Godkin et al. |
| 4,620,752 A | 11/1986 | Fremerey et al. |
| 4,639,626 A | 1/1987 | McGee |
| 4,647,802 A * | 3/1987 | Konecny ............... 310/216.075 |
| 4,658,166 A | 4/1987 | Oudet |
| 4,704,555 A | 11/1987 | Stokes |
| 4,794,286 A | 12/1988 | Taenzer |
| 4,797,602 A | 1/1989 | West |
| 4,801,834 A | 1/1989 | Stokes |
| 4,835,840 A | 6/1989 | Stokes |
| 4,850,100 A | 7/1989 | Stokes |
| 4,857,786 A | 8/1989 | Nihei et al. |
| 4,883,999 A | 11/1989 | Hendershot |
| 4,899,072 A | 2/1990 | Ohta |
| 4,900,965 A | 2/1990 | Fisher |
| 4,959,577 A | 9/1990 | Radomski |
| 4,990,812 A | 2/1991 | Nam |
| 5,015,903 A | 5/1991 | Hancock |
| 5,038,066 A | 8/1991 | Pawlak et al. |
| 5,051,641 A | 9/1991 | Weh |
| 5,062,012 A | 10/1991 | Maeda et al. |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd et al. |
| 5,195,231 A | 3/1993 | Fanning et al. |
| 5,208,503 A | 5/1993 | Hisey |
| 5,212,419 A | 5/1993 | Fisher et al. |
| 5,214,333 A | 5/1993 | Kawamura |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,338,996 A | 8/1994 | Yamamoto |
| 5,370,200 A | 12/1994 | Takata |
| 5,382,859 A | 1/1995 | Huang et al. |
| 5,386,166 A | 1/1995 | Reimer et al. |
| 5,474,148 A | 12/1995 | Takata |
| 5,477,841 A | 12/1995 | Trost et al. |
| 5,485,072 A | 1/1996 | Fehringer |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,696,419 A | 12/1997 | Rakestraw et al. |
| 5,712,521 A | 1/1998 | Detela |
| 5,717,262 A | 2/1998 | Muller et al. |
| 5,723,921 A | 3/1998 | Sugiura |
| 5,726,514 A | 3/1998 | Wurz et al. |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,839,530 A | 11/1998 | Dietzel |
| 5,879,265 A | 3/1999 | Bek |
| 5,886,449 A | 3/1999 | Mitcham |
| 5,889,348 A | 3/1999 | Muhlberger et al. |
| 5,894,183 A | 4/1999 | Borchert |
| 5,909,339 A | 6/1999 | Hong |
| 5,925,965 A | 7/1999 | Li et al. |
| 5,942,828 A | 8/1999 | Hill |
| 5,954,779 A | 9/1999 | Dietzel |
| 5,973,436 A | 10/1999 | Mitcham |
| 5,994,802 A | 11/1999 | Shichijyo et al. |
| 5,994,814 A | 11/1999 | Kawabata |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,118 A | 8/2000 | Hull |
| 6,097,126 A | 8/2000 | Takura |
| 6,118,159 A | 9/2000 | Willer |
| 6,121,712 A | 9/2000 | Sakamoto |
| 6,133,655 A | 10/2000 | Suzuki et al. |
| 6,133,664 A | 10/2000 | Torok et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,175,177 B1 | 1/2001 | Sabinski et al. |
| 6,177,748 B1 | 1/2001 | Katcher et al. |
| 6,181,035 B1 | 1/2001 | Acquaviva |
| 6,194,799 B1 | 2/2001 | Miekka et al. |
| 6,215,616 B1 | 4/2001 | Phan et al. |
| 6,229,238 B1 | 5/2001 | Graef |
| 6,232,693 B1 | 5/2001 | Gierer et al. |
| 6,236,131 B1 | 5/2001 | Schafer |
| 6,246,561 B1 | 6/2001 | Flynn |
| 6,276,479 B1 | 8/2001 | Suzuki et al. |
| 6,278,216 B1 | 8/2001 | Li |
| 6,288,467 B1 | 9/2001 | Lange et al. |
| 6,300,702 B1 | 10/2001 | Jack et al. |
| 6,304,010 B1 | 10/2001 | Sugiura |
| 6,333,582 B1 | 12/2001 | Asao |
| 6,342,746 B1 | 1/2002 | Flynn |
| 6,365,999 B1 | 4/2002 | Muhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,508,321 B1 | 1/2003 | Mueller |
| 6,545,382 B1 | 4/2003 | Bennett |
| 6,603,060 B1 | 8/2003 | Ohashi et al. |
| 6,603,237 B1 | 8/2003 | Caamano |
| 6,629,574 B2 | 10/2003 | Turner |
| 6,657,329 B2 | 12/2003 | Kastinger et al. |
| 6,664,704 B2 | 12/2003 | Calley |
| 6,700,271 B2 | 3/2004 | Detela |
| 6,707,208 B2 | 3/2004 | Durham et al. |
| 6,717,297 B2 | 4/2004 | Sadarangani et al. |
| 6,750,582 B1 | 6/2004 | Neet |
| 6,765,321 B2 | 7/2004 | Sakamoto |
| 6,774,512 B2 | 8/2004 | Takagi et al. |
| 6,791,225 B2 | 9/2004 | Campbell et al. |
| 6,794,791 B2 | 9/2004 | Ben Ahmed et al. |
| 6,806,602 B2 | 10/2004 | Hilzinger |
| 6,815,863 B1 | 11/2004 | Jack et al. |
| 6,835,941 B1 | 12/2004 | Tanaka |
| 6,841,908 B2 | 1/2005 | Hasegawa |
| 6,847,135 B2 | 1/2005 | Kastinger et al. |
| 6,849,985 B2 | 2/2005 | Jack et al. |
| 6,853,112 B2 | 2/2005 | Nakamura et al. |
| 6,866,111 B2 | 3/2005 | Dube |
| 6,867,530 B2 | 3/2005 | Gamm et al. |
| 6,879,080 B2 | 4/2005 | Caamano |
| 6,882,066 B2 | 4/2005 | Kastinger |
| 6,882,077 B2 | 4/2005 | Neet |
| 6,885,124 B2 | 4/2005 | Neet |

(56) References Cited

U.S. PATENT DOCUMENTS

| | | | |
|---|---|---|---|
| 6,885,129 B1 | 4/2005 | Oohashi et al. | |
| 6,888,272 B2 | 5/2005 | Kastinger | |
| 6,891,299 B2* | 5/2005 | Coupart et al. | 310/156.55 |
| 6,924,576 B2 | 8/2005 | Zierer et al. | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,952,068 B2 | 10/2005 | Gieras | |
| 6,960,860 B1 | 11/2005 | DeCristofaro | |
| 6,960,862 B2 | 11/2005 | Hill | |
| 6,979,925 B2 | 12/2005 | Schwamm | |
| 6,989,622 B1 | 1/2006 | Chen et al. | |
| 7,015,603 B2 | 3/2006 | Barrho et al. | |
| 7,026,737 B2 | 4/2006 | Angerer et al. | |
| 7,030,529 B2 | 4/2006 | Dommsch et al. | |
| 7,030,534 B2 | 4/2006 | Caamano | |
| 7,034,425 B2 | 4/2006 | Detela | |
| 7,064,469 B2 | 6/2006 | Jack et al. | |
| 7,067,954 B2 | 6/2006 | Kuribayashi et al. | |
| 7,071,593 B2 | 7/2006 | Matsushita et al. | |
| 7,124,495 B2 | 10/2006 | Gieras | |
| 7,126,313 B2 | 10/2006 | Dooley | |
| 7,129,602 B2 | 10/2006 | Lange et al. | |
| 7,135,802 B2 | 11/2006 | Seki et al. | |
| 7,208,856 B2 | 4/2007 | Imai et al. | |
| 7,211,922 B2 | 5/2007 | Isoda et al. | |
| 7,216,732 B2 | 5/2007 | Angerer | |
| 7,230,361 B2 | 6/2007 | Hirzel | |
| 7,242,118 B2 | 7/2007 | Sakamoto | |
| 7,245,055 B2 | 7/2007 | Jack | |
| 7,250,704 B1 | 7/2007 | Sortore et al. | |
| 7,259,483 B2 | 8/2007 | Komiya et al. | |
| 7,261,186 B2 | 8/2007 | Deplazes | |
| 7,265,472 B2 | 9/2007 | Mitcham | |
| 7,268,456 B2 | 9/2007 | Harada et al. | |
| 7,275,844 B2 | 10/2007 | Watanabe | |
| 7,279,820 B2 | 10/2007 | Grundl et al. | |
| 7,358,639 B2 | 4/2008 | Caamano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,474,030 B2 | 1/2009 | Mitcham | |
| 7,560,840 B2 | 7/2009 | Lange | |
| 7,568,714 B2 | 8/2009 | Sasnowski et al. | |
| 7,579,742 B1 | 8/2009 | Rittenhouse | |
| 7,585,258 B2 | 9/2009 | Watson et al. | |
| 7,592,735 B2 | 9/2009 | Hamada | |
| 7,602,095 B2 | 10/2009 | Kusase et al. | |
| 7,626,308 B2 | 12/2009 | Kang | |
| 7,638,919 B2 | 12/2009 | Pulnikov et al. | |
| 7,679,253 B2 | 3/2010 | Neet | |
| 7,719,156 B2 | 5/2010 | Muhlberger | |
| 7,800,275 B2 | 9/2010 | Calley | |
| 7,816,830 B2 | 10/2010 | Dickes | |
| 7,851,965 B2 | 12/2010 | Calley | |
| 7,859,141 B2 | 12/2010 | Sadarangani | |
| 7,863,797 B2 | 1/2011 | Calley | |
| 7,868,508 B2 | 1/2011 | Calley et al. | |
| 7,868,511 B2 | 1/2011 | Calley | |
| 7,876,019 B2 | 1/2011 | Calley | |
| 7,923,886 B2 | 4/2011 | Calley et al. | |
| 7,952,252 B2 | 5/2011 | Kang | |
| 7,973,446 B2 | 7/2011 | Calley et al. | |
| 2001/0001528 A1 | 5/2001 | Ragaly | |
| 2001/0030479 A1 | 10/2001 | Mohler | |
| 2001/0030486 A1 | 10/2001 | Pijanowski | |
| 2001/0030487 A1 | 10/2001 | Higashino et | |
| 2002/0070627 A1 | 6/2002 | Ward et al. | |
| 2002/0113520 A1 | 8/2002 | Kastinger et al. | |
| 2002/0135242 A1 | 9/2002 | Kawai | |
| 2002/0171315 A1 | 11/2002 | Kastinger | |
| 2002/0175586 A1* | 11/2002 | Hill | 310/179 |
| 2002/0190585 A1 | 12/2002 | Sakamoto | |
| 2003/0048018 A1 | 3/2003 | Sadarangani | |
| 2003/0102751 A1 | 6/2003 | Bryant | |
| 2003/0122439 A1 | 7/2003 | Horst | |
| 2003/0122440 A1 | 7/2003 | Horst | |
| 2003/0122442 A1 | 7/2003 | Jack et al. | |
| 2004/0027021 A1 | 2/2004 | Karrelmeyer | |
| 2004/0036370 A1 | 2/2004 | Hilzinger | |
| 2004/0046478 A1 | 3/2004 | Zierer et al. | |
| 2004/0061396 A1 | 4/2004 | Narita et al. | |
| 2004/0135458 A1* | 7/2004 | Neet | 310/208 |
| 2004/0140730 A1 | 7/2004 | Barrho et al. | |
| 2004/0145269 A1 | 7/2004 | Barrho et al. | |
| 2004/0150288 A1* | 8/2004 | Calley | 310/257 |
| 2004/0189138 A1 | 9/2004 | Jack | |
| 2004/0191519 A1 | 9/2004 | Kejzelman et al. | |
| 2004/0207281 A1 | 10/2004 | Detela | |
| 2004/0207283 A1 | 10/2004 | Oohashi | |
| 2004/0212267 A1 | 10/2004 | Jack et al. | |
| 2004/0222706 A1 | 11/2004 | Ickinger | |
| 2004/0232793 A1 | 11/2004 | Fujita et al. | |
| 2004/0232799 A1 | 11/2004 | Chen et al. | |
| 2004/0239207 A1 | 12/2004 | Kloepzig et al. | |
| 2004/0251759 A1 | 12/2004 | Hirzel | |
| 2004/0251761 A1 | 12/2004 | Hirzel | |
| 2004/0262105 A1 | 12/2004 | Li et al. | |
| 2005/0006978 A1 | 1/2005 | Bradfield | |
| 2005/0012427 A1 | 1/2005 | Seki et al. | |
| 2005/0029879 A1 | 2/2005 | Endo | |
| 2005/0062348 A1 | 3/2005 | Ohnishi et al. | |
| 2005/0062352 A1 | 3/2005 | Kastinger | |
| 2005/0088056 A1 | 4/2005 | Kuribayashi | |
| 2005/0116575 A1* | 6/2005 | Zepp et al. | 310/218 |
| 2005/0121983 A1 | 6/2005 | Ehrhart | |
| 2005/0139038 A1 | 6/2005 | Kjellen et al. | |
| 2005/0156479 A1 | 7/2005 | Fujita et al. | |
| 2005/0156480 A1 | 7/2005 | Imai | |
| 2005/0212381 A1 | 9/2005 | Gilmour et al. | |
| 2005/0242679 A1 | 11/2005 | Walter et al. | |
| 2006/0012259 A1 | 1/2006 | Kerlin | |
| 2006/0012263 A1 | 1/2006 | Smith et al. | |
| 2006/0055280 A1 | 3/2006 | Isoda | |
| 2006/0082237 A1 | 4/2006 | Kerlin | |
| 2006/0087180 A1 | 4/2006 | Woo et al. | |
| 2006/0091755 A1 | 5/2006 | Carlisle | |
| 2006/0131974 A1 | 6/2006 | Sadarangani et al. | |
| 2006/0131986 A1 | 6/2006 | Hsu et al. | |
| 2006/0186754 A1 | 8/2006 | Kitamura et al. | |
| 2006/0192453 A1 | 8/2006 | Gieras et al. | |
| 2006/0220477 A1 | 10/2006 | Okumoto et al. | |
| 2006/0261688 A1 | 11/2006 | Akita et al. | |
| 2007/0013253 A1* | 1/2007 | Dubois et al. | 310/156.02 |
| 2007/0046137 A1 | 3/2007 | Ooiwa | |
| 2007/0046139 A1 | 3/2007 | Ishizuka | |
| 2007/0075605 A1 | 4/2007 | Enomoto et al. | |
| 2007/0138900 A1 | 6/2007 | Imai et al. | |
| 2007/0152528 A1* | 7/2007 | Kang et al. | 310/156.55 |
| 2007/0176505 A1 | 8/2007 | Trzynadlowski et al. | |
| 2007/0188037 A1 | 8/2007 | Lau | |
| 2007/0252447 A1* | 11/2007 | Ionel et al. | 310/44 |
| 2008/0007126 A1 | 1/2008 | Popov et al. | |
| 2008/0042507 A1 | 2/2008 | Edelson | |
| 2008/0169776 A1 | 7/2008 | Acker | |
| 2008/0179982 A1 | 7/2008 | Kramer | |
| 2008/0211326 A1 | 9/2008 | Kang et al. | |
| 2008/0211336 A1 | 9/2008 | Sadarangani | |
| 2008/0238237 A1 | 10/2008 | Nishihama et al. | |
| 2008/0246362 A1 | 10/2008 | Hirzel | |
| 2008/0265707 A1 | 10/2008 | Bradfield | |
| 2008/0309188 A1 | 12/2008 | Calley | |
| 2008/0315700 A1 | 12/2008 | Ishikawa et al. | |
| 2009/0021099 A1 | 1/2009 | Shkondin | |
| 2009/0026853 A1 | 1/2009 | Groening | |
| 2009/0026866 A1 | 1/2009 | Groening et al. | |
| 2009/0042051 A1 | 2/2009 | Skarman et al. | |
| 2009/0085415 A1 | 4/2009 | Ionel et al. | |
| 2009/0127942 A1 | 5/2009 | Rahman et al. | |
| 2009/0152489 A1 | 6/2009 | Kjellen et al. | |
| 2009/0206693 A1 | 8/2009 | Calley et al. | |
| 2009/0208771 A1 | 8/2009 | Janecek | |
| 2009/0243406 A1 | 10/2009 | Jack et al. | |

(56) References Cited

U.S. PATENT DOCUMENTS

| | | | |
|---|---|---|---|
| 2009/0255924 A1 | 10/2009 | Lovens | |
| 2009/0284253 A1 | 11/2009 | Finkler et al. | |
| 2009/0295237 A1 | 12/2009 | Gloor | |
| 2009/0322165 A1 | 12/2009 | Rittenhouse | |
| 2010/0013341 A1 | 1/2010 | Vollmer | |
| 2010/0013343 A1 | 1/2010 | Bi | |
| 2010/0015432 A1 | 1/2010 | Bergmark et al. | |
| 2010/0019588 A1* | 1/2010 | Makino et al. | 310/52 |
| 2010/0026135 A1 | 2/2010 | Hussey | |
| 2010/0038580 A1 | 2/2010 | Ye et al. | |
| 2010/0052467 A1 | 3/2010 | Gieras | |
| 2010/0109462 A1* | 5/2010 | Calley et al. | 310/90 |
| 2010/0123426 A1* | 5/2010 | Nashiki et al. | 318/701 |
| 2010/0253171 A1* | 10/2010 | El-Refaie et al. | 310/156.53 |
| 2011/0025140 A1 | 2/2011 | Pennander et al. | |
| 2011/0025141 A1 | 2/2011 | Nord et al. | |
| 2011/0037329 A1 | 2/2011 | Nord et al. | |
| 2011/0050010 A1 | 3/2011 | Calley et al. | |
| 2011/0062723 A1 | 3/2011 | Calley et al. | |
| 2011/0133485 A1 | 6/2011 | Gieras | |
| 2011/0169357 A1 | 7/2011 | Gieras | |

FOREIGN PATENT DOCUMENTS

| | | |
|---|---|---|
| DE | 3602687 | 8/1987 |
| DE | 8711725 | 8/1987 |
| DE | 3904516 | 6/1990 |
| DE | 3927453 | 2/1991 |
| DE | 4132340 | 3/1993 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102006048561 | 4/2008 |
| DE | 102006051234 | 5/2008 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0998010 | 3/2000 |
| EP | 1063754 | 12/2000 |
| EP | 1117168 | 7/2001 |
| EP | 1227566 | 7/2002 |
| EP | 1921730 | 5/2008 |
| EP | 1923683 | 5/2008 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 1007577330000 | 9/2007 |
| KR | 10-2008-006141 | 9/2008 |
| WO | WO 93/14551 | 7/1993 |
| WO | WO 99/34497 | 7/1999 |
| WO | 0130643 | 5/2001 |
| WO | WO 02/075895 | 9/2002 |
| WO | 03003548 | 1/2003 |
| WO | 2004111591 | 12/2004 |
| WO | WO 2005/091475 | 9/2005 |
| WO | 2006117210 | 5/2006 |
| WO | 2006091089 | 8/2006 |
| WO | WO 2007024184 | 3/2007 |
| WO | 2008128659 | 10/2008 |
| WO | 2009027938 | 3/2009 |
| WO | WO 2009116935 | 9/2009 |
| WO | WO 2009116936 | 9/2009 |
| WO | WO 2009116937 | 9/2009 |
| WO | 2009133295 | 11/2009 |
| WO | 2009156297 | 12/2009 |
| WO | 2010036221 | 4/2010 |
| WO | 2010048928 | 5/2010 |
| WO | 2010076081 | 7/2010 |
| WO | 2010094515 | 8/2010 |
| WO | 2011080285 | 7/2011 |
| WO | 2011080293 | 7/2011 |
| WO | 2011080294 | 7/2011 |

OTHER PUBLICATIONS

Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
International Search Report and Written Opinion dated Aug. 15, 2008 for International Patent Application No. PCT/US2008/063301.
IPRP dated Nov. 10, 2009 for International Patent Application No. PCT/US2008/063301.
International Search Report and Written Opinion dated Aug. 20, 2008 for International Patent Application No. PCT/US2008/063236.
International Preliminary Report on Patentability dated Nov. 17, 2009 for International Patent Application No. PCT/US2008/063236.
International Search Report and Written Opinion dated Oct. 24, 2008 for International Patent Application No. PCT/US2008/063336.
International Preliminary Report on Patentability dated Nov. 17, 2009 for International Patent Application No. PCT/US2008/063336.
International Search Report and Written Opinion dated Aug. 15, 2008 for International Patent Application No. PCT/US2008/063287.
International Preliminary Report on Patentability dated Nov. 10, 2009 for International Patent Application No. PCT/US2008/063287.
International Search Report and Written Opinion dated Nov. 10, 2009 for International Patent Application No. PCT/US2008/063268.
International Preliminary Report on Patentability dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.
"Permanent Magnet Assisted Synchronous Reluctance Motor Design and Performance Improvement",—A Dissertation by Peyman Niazi, Texas A&M University, Dec. 2005.

(56) References Cited

OTHER PUBLICATIONS

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Dubois, Maxine R. et al.; "Clawpole Transverse-Flux Machine with Hybrid Stator"; pp. 1-6.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo.

www.higenmotor.com/eng/aboutus/about06read.asp?id=notice& no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials and machines?makePrintable=1; retrieved Jan. 15, 2010.

Raser Technologies Company Brochure.

Response to Office Action filed Jan. 15, 2010 for Japanese Patent Application No. JPPA-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

International Search Report and Written Opinion dated Jun. 10, 2010 for International Application No. PCT/US2009/063145.

International Search Report and Written Opinion dated Jun. 10, 2010 for International Application No. PCT/US2009/063142.

International Search Report and Written Opinion dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

Restriction Requirement dated Dec. 20, 2010 for U.S. Appl. No. 12/149,933.

Final Office Action dated Jan. 4, 2011 for U.S. Appl. No. 12/149,936.

Restriction Requirement dated Feb. 24, 2011 for U.S. Appl. No. 12/942,495.

Notice of Allowance dated Feb. 28, 2011 for U.S. Appl. No. 12/149,936.

"Two Dimensional Finite Analysis of Passive Rotor Transverse Flux Motors with Slanted Rotor Design" by B.E. Hasubek, et al., May 1999.

Notice of Allowance dated Nov. 2, 2010 for U.S. Appl. No. 12/847,991.

Notice of Allowance dated Dec. 9, 2010 for U.S. Appl. No. 12/611,733.

International Preliminary Report on Patentability dated May 3, 2011, PCT/US2009/063142.

International Preliminary Report on Patentability dated May 3, 2011, PCT/US2009/063145.

International Preliminary Report on Patentability dated May 3, 2011, PCT/US2009/063147.

Notice of Allowance dated May 23, 2011, U.S. Appl. No. 13/039,837.

Notice of Allowance dated Jul. 8, 2011, U.S. Appl. No. 12/772,958.

Restriction Requirement dated Jul. 7, 2011, U.S. Appl. No. 12/772,959.

Restriction Requirement dated Jul. 7, 2011 for U.S. Appl. No. 12/772,962.

Notice of Allowance dated May 24, 2011 for U.S. Appl. No. 12/149,933.

Office Action dated Sep. 12, 2011 for U.S. Appl. No. 12/772,962.

Office Action dated Sep. 14, 2011 for U.S. Appl. No. 12/772,959.

Office Action dated Sep. 20, 2011 for U.S. Appl. No. 13/112,619.

Non-Final Office Action dated Jun. 28, 2012 of U.S. Appl. No. 13/291,373, filed Nov. 8, 2011 (now US Patent No. 8405275 issued Mar. 26, 2013) (12 pages).

\* cited by examiner

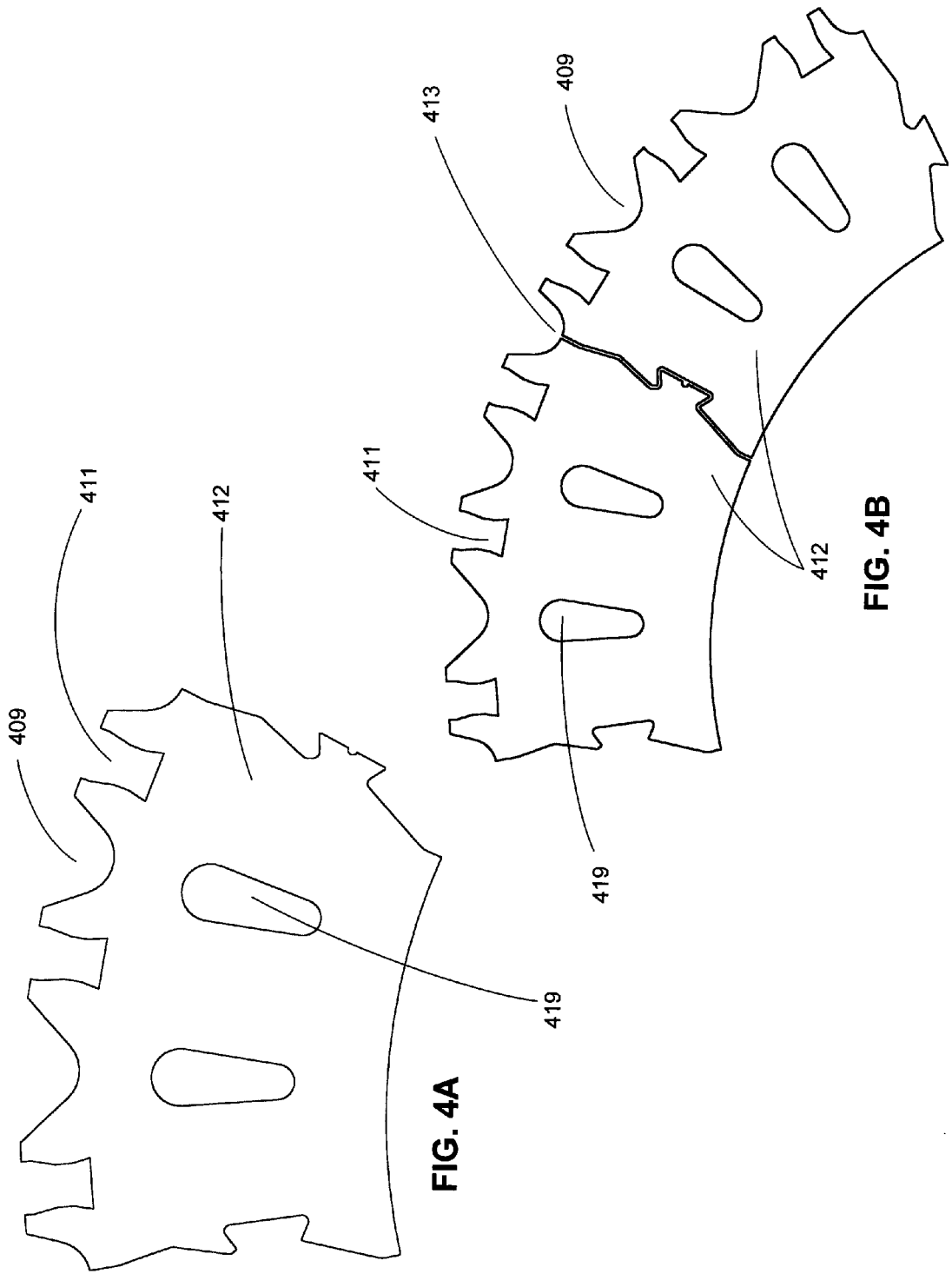

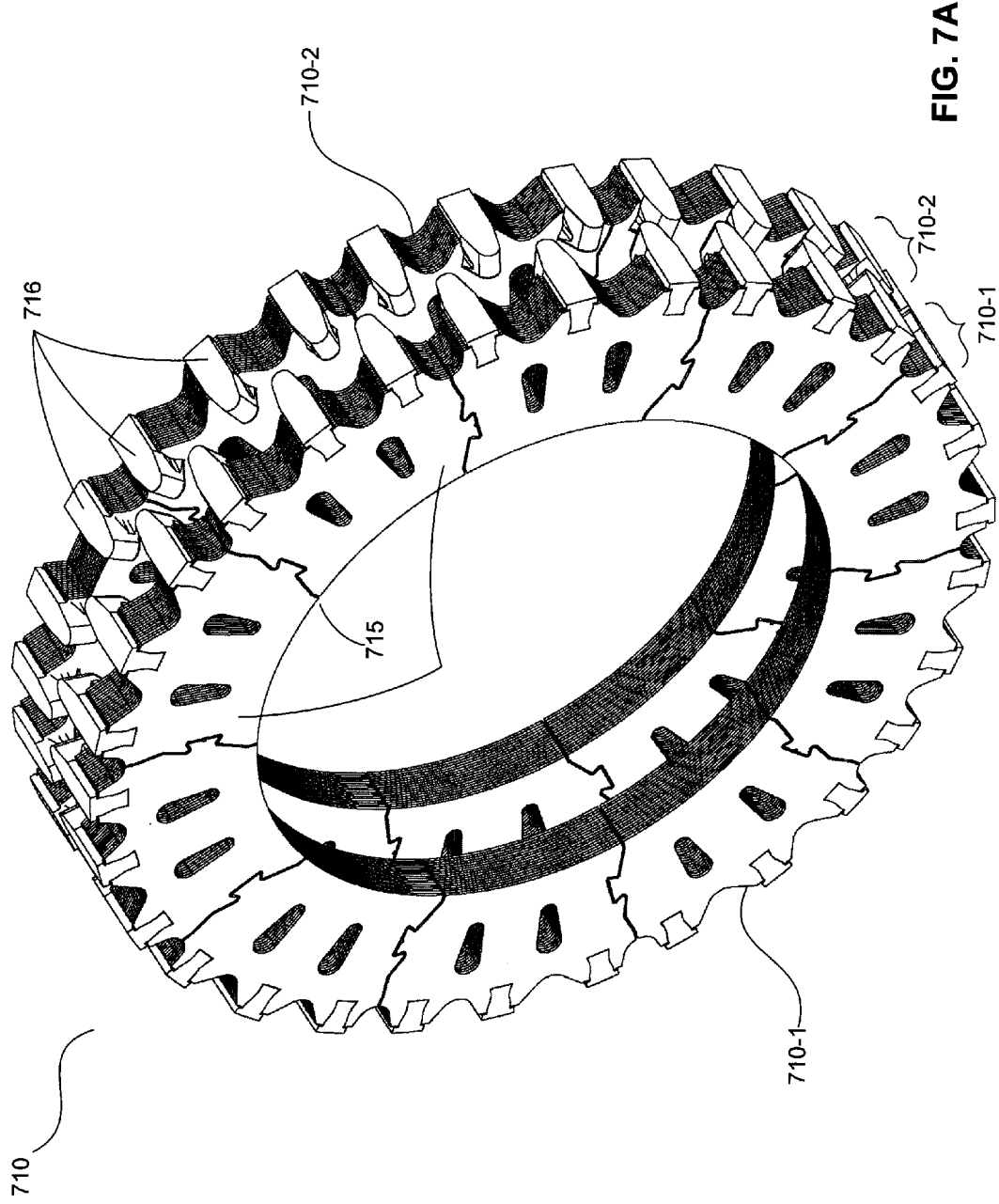

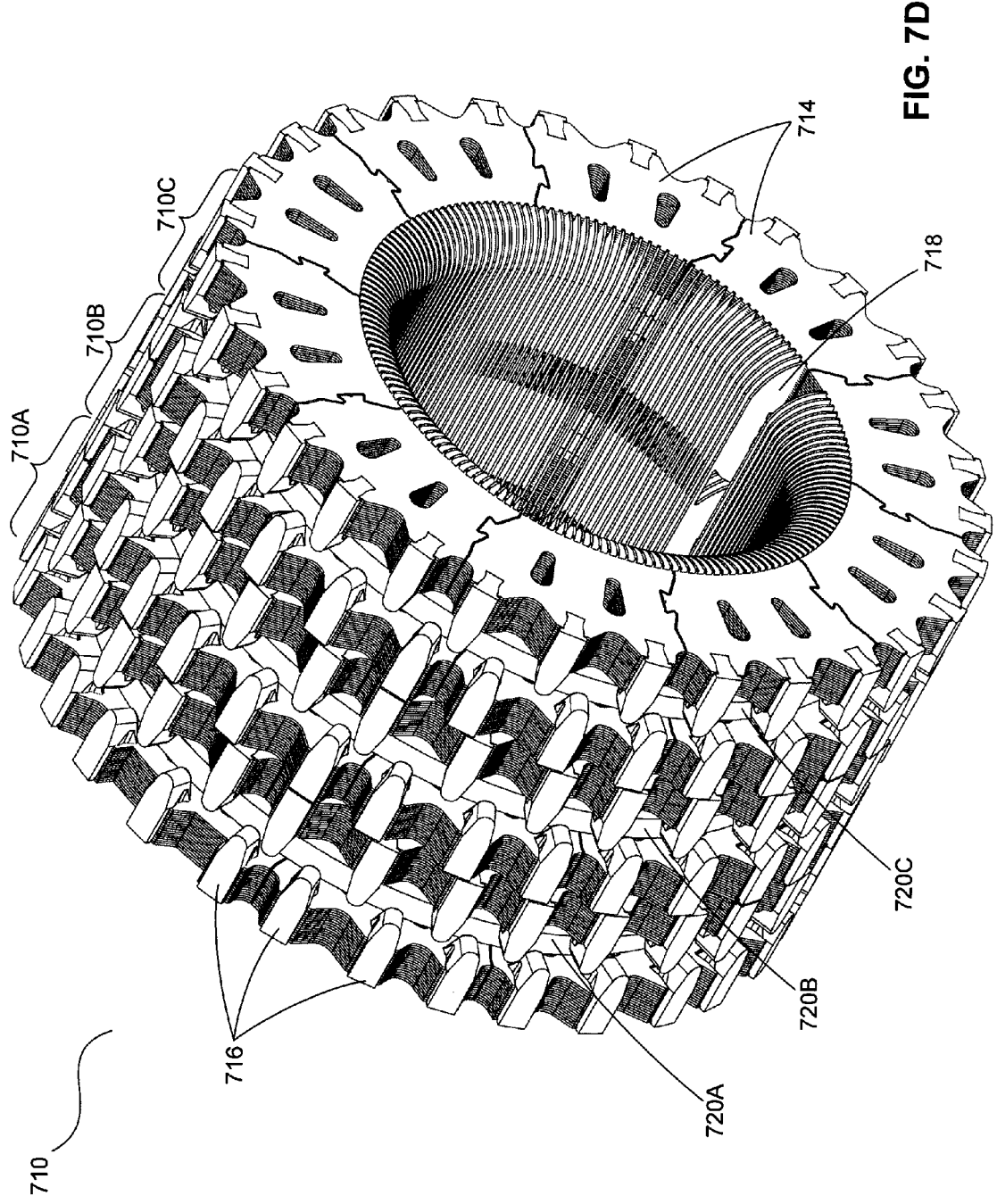

TRANSVERSE AND/OR COMMUTATED FLUX SYSTEMS HAVING LAMINATED AND POWDERED METAL PORTIONS

CROSS REFERENCE TO RELATED APPLICATIONS

This application is a non-provisional of U.S. Provisional No. 61/414,769 filed on Nov. 17, 2010 and entitled "TRANSVERSE AND/OR COMMUTATED FLUX SYSTEMS HAVING SEGMENTED STATOR LAMINATIONS."

This application is also a non-provisional of U.S. Provisional No. 61/414,774 filed on Nov. 17, 2010 and entitled "TRANSVERSE AND/OR COMMUTATED FLUX SYSTEM COIL CONCEPTS."

This application is also a non-provisional of U.S. Provisional No. 61/414,781 filed on Nov. 17, 2010 and entitled "TRANSVERSE AND/OR COMMUTATED FLUX SYSTEMS HAVING LAMINATED AND POWDERED METAL PORTIONS."

This application is also a non-provisional of U.S. Provisional No. 61/453,075 filed on Mar. 15, 2011 and entitled "TRANSVERSE AND/OR COMMUTATED FLUX SYSTEMS HAVING LAMINATED AND POWDERED METAL PORTIONS." The entire contents of all the foregoing applications are hereby incorporated by reference.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable, including those configured with laminated and/or powdered metal portions and combinations thereof.

BRIEF DESCRIPTION OF THE DRAWINGS

With reference to the following description, appended claims, and accompanying drawings:

FIG. 4A illustrates a side lamination in accordance with an exemplary embodiment;

FIG. 4B illustrates side laminations having interlocking cuts in accordance with an exemplary embodiment;

FIG. 7A illustrates two ring-shaped stator halves for a transverse flux machine in accordance with an exemplary embodiment;

FIG. 7D illustrates a polyphase stator assembly for a transverse flux machine in accordance with an exemplary embodiment;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor, a generator, and/or the like.

Various shortcomings of prior electrical machines can be addressed by utilizing transverse flux machines and/or commutated flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

There is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 2A:
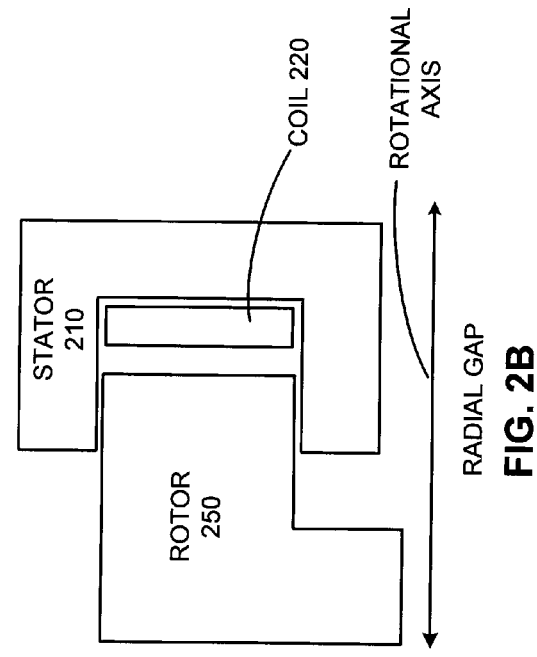
FIG. 2A illustrates an exemplary axial gap configuration in accordance with an exemplary embodiment.
Figure 2B:
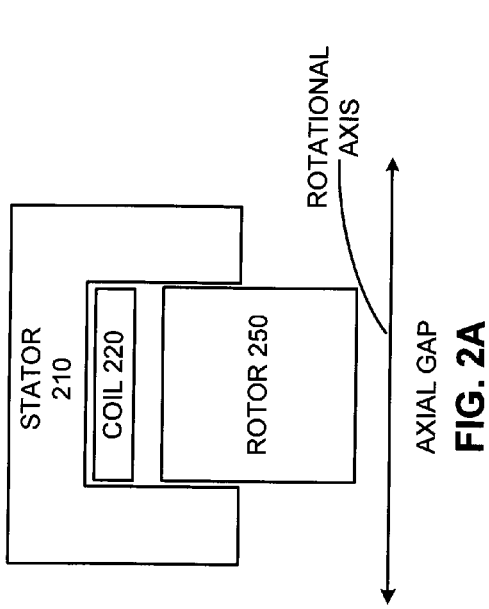
FIG. 2B illustrates an exemplary radial gap configuration in accordance with an exemplary embodiment.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap." Similar approaches may be followed in transverse flux machines and are referred to in a similar manner.

Figure 3A:
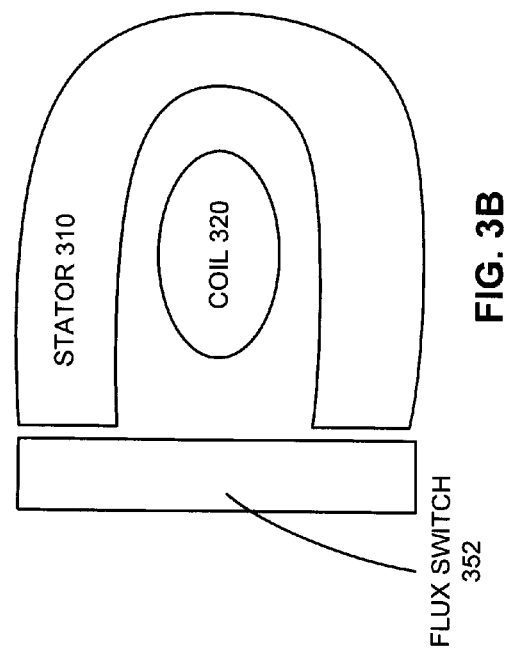
FIG. 3A illustrates an exemplary cavity engaged configuration in accordance with an exemplary embodiment.
Figure 3B:
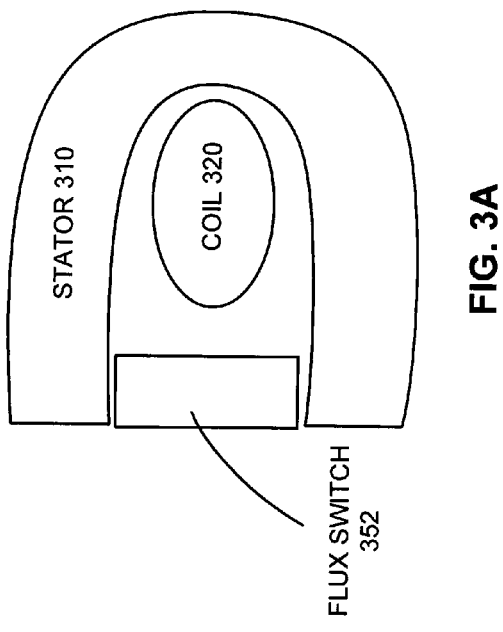
FIG. 3B illustrates an exemplary face engaged configuration in accordance with an exemplary embodiment.
Figure 3C:
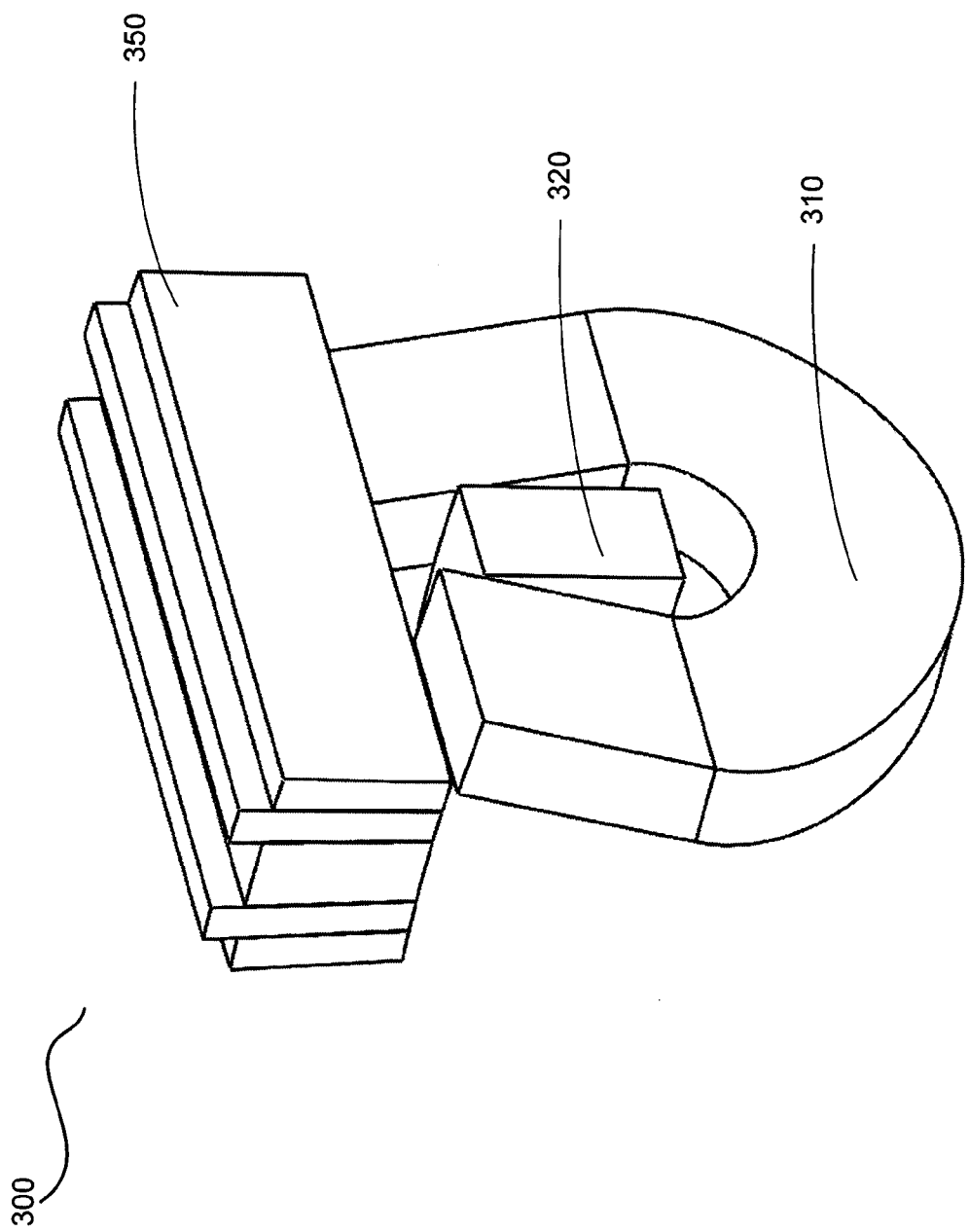
FIG. 3C illustrates an exemplary face engaged transverse flux configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Yet further, many prior electric motors have offered limited torque density. As used herein, "torque density" refers to Newton-meters of continuous torque produced per kilogram of active electrical and magnetic materials in the motor. In an exemplary embodiment, continuous torque is defined as a level of output torque that produces a maximum (spatial) equilibrium temperature of 100 degrees Celsius in the motor stator, responsive to a load of duty type S1 as defined in International Electrotechnical Commission (IEC) standard 60034-1, given ambient temperature of 25 degrees Celsius and airflow of 8 kilometers per hour around the motor.

For example, many prior electric motors are configured with a torque density of between about 0.5 Newton-meters per kilogram and about 3 Newton-meters per kilogram. Consequently, a motor of sufficient torque and/or power for a particular application may be difficult or even impossible to fit in an available area, for example when a motor sized to produce sufficient torque becomes too massive to fit in a confined space. In the case of e-bikes, the associated space constraints (for example, the limited space available in a bicycle wheel hub) often result in inclusion of comparatively underpowered and/or overweight motors, for example motors having a maximum power output of about 500 to about 900 watts.

A transverse flux machine and/or commutated flux machine in accordance with principles of the present disclosure may be configured with any suitable components, structures, and/or elements in order to provide desired electrical, magnetic, and/or physical properties. For example, a transverse flux machine having a continuous, thermally stable torque density in excess of 30 Newton-meters per kilogram of active electrical and magnetic material may be achieved by utilizing powdered metal teeth in connection with lamination stacks. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without significant thermal performance degradation and/or damage.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil resistance and/or the number of turns in the coil may thus be achieved. Similarly, as the voltage may be higher, the current may be smaller, resulting in a more efficient machine.

Yet further, in accordance with principles of the present disclosure, a transverse flux machine and/or commutated flux machine may be configured to achieve a high flux switching frequency, for example a flux switching frequency in excess of 500 Hz. Because flux is switched at a high frequency, torque density may be increased.

An electrical machine, for example an electric motor, may be any system configured to facilitate the switching of magnetic flux. In various exemplary embodiments, an electric motor may comprise a transverse flux machine and/or a commutated flux machine. In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit (i.e., a portion where the permeability is significantly higher than air). A magnet may be located on the stator or the rotor. Optionally, flux concentrating portions may be included on the stator and/or the rotor.

A coil may be at least partially enclosed and/or partially surrounded by the stator or the rotor. In an exemplary embodiment, a "partially enclosed" or "partially surrounded" coil may be considered to be a coil wherein more than 50% of the coil exterior is surrounded by the stator and/or rotor. In another exemplary embodiment, a "partially enclosed" or "partially surrounded" coil may be considered to be a coil wherein a magnet, a flux concentrator, and/or a flux switch surrounds the coil by greater than 180 degrees (i.e., more than halfway around the coil).

Figure 1B:
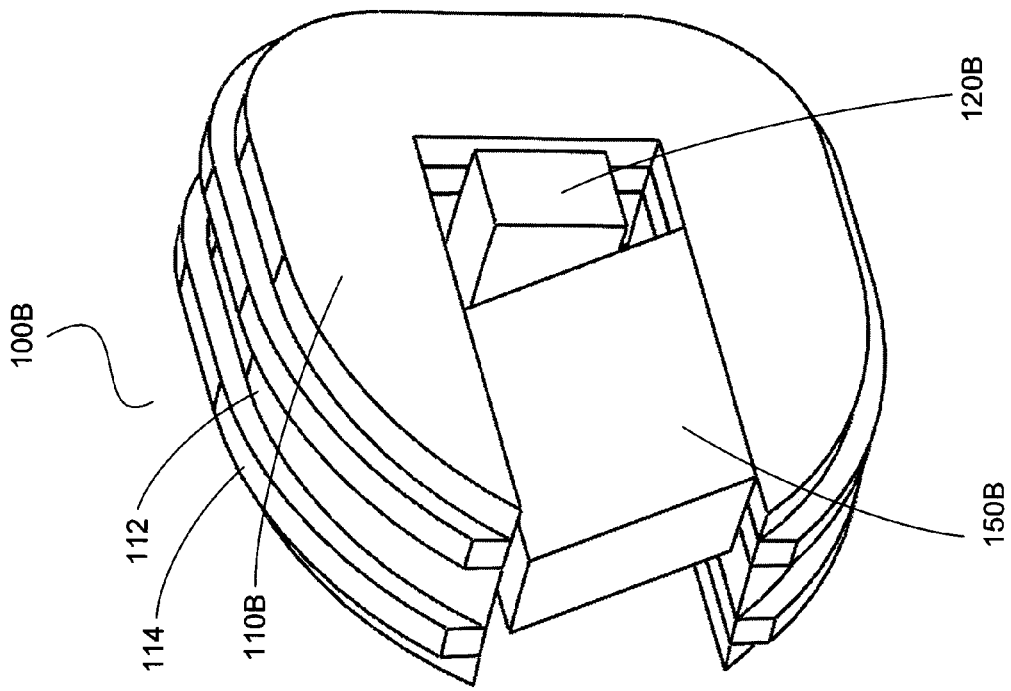
FIG. 1B illustrates an exemplary commutated flux machine in accordance with an exemplary embodiment.
Figure 1A:
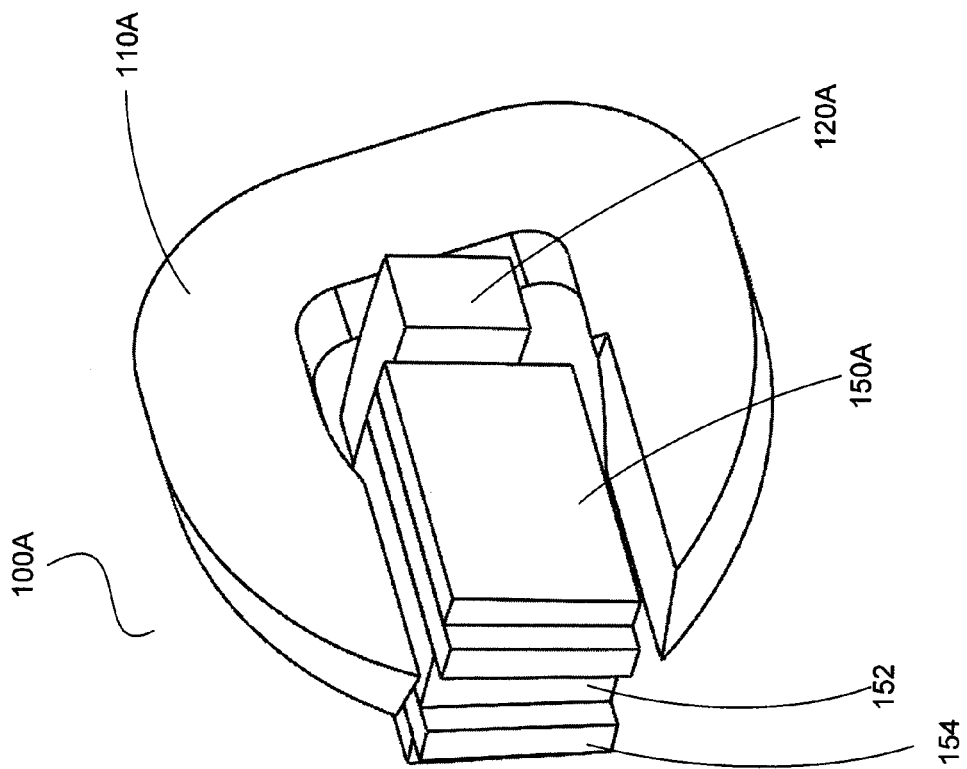
FIG. 1A illustrates an exemplary transverse flux machine in accordance with an exemplary embodiment.

In accordance with an exemplary embodiment, and with renewed reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Figure 4C:
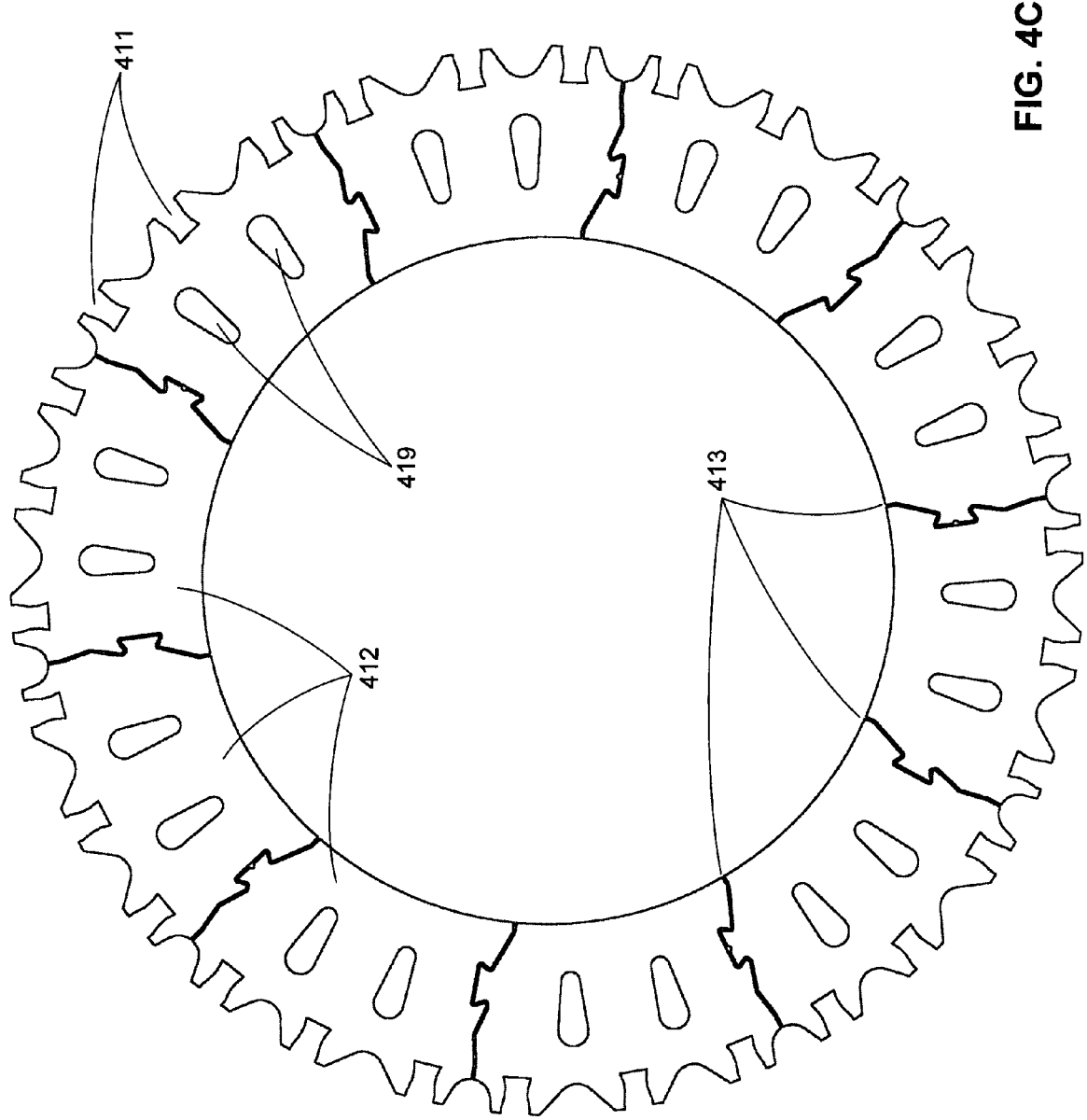
FIG. 4C illustrates a generally ring-shaped structure comprising multiple side laminations having interlocking cuts in accordance with an exemplary embodiment.

Turning now to FIGS. 4A-4C, in accordance with various exemplary embodiments a transverse flux machine and/or commutated flux machine may utilize one or more side laminations 412. Side lamination 412 may be configured with one or more slot-like "trenches" 411 on an edge thereof. Additionally, side lamination 412 may be configured with one or more grooves 409 separating trenches 411 from one another. Grooves 409 may be configured with portions and/or edges that are concave, convex, curved, linear, angular, and/or combinations of the same. Side lamination 412 may also be configured with interlocking and/or interlockable portions, for example by making an interlocking cut 413 therethrough, or by stamping a sheet of planar material to form a "puzzle-piece" shape on an edge of side lamination 412. Yet further, side lamination 412 may be configured with one or more holes 419 therethrough, for example in order to reduce weight. Multiple side laminations 412 may be utilized to form a generally ring-shaped structure, for example for use in a stator of a transverse flux machine.

Figure 4D:
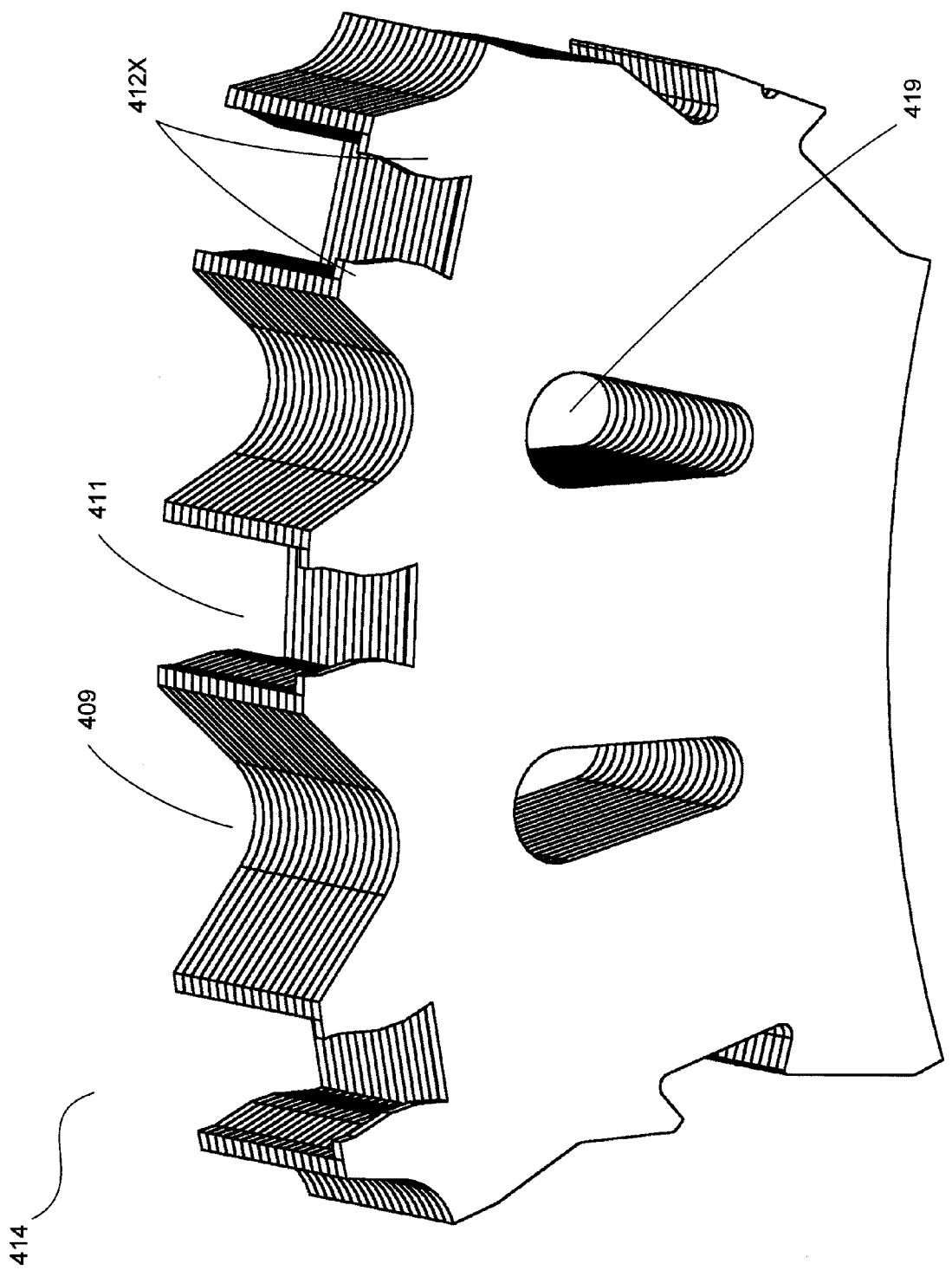
FIGS. 4D and 4E illustrate a lamination stack in accordance with an exemplary embodiment.
Figure 4E:
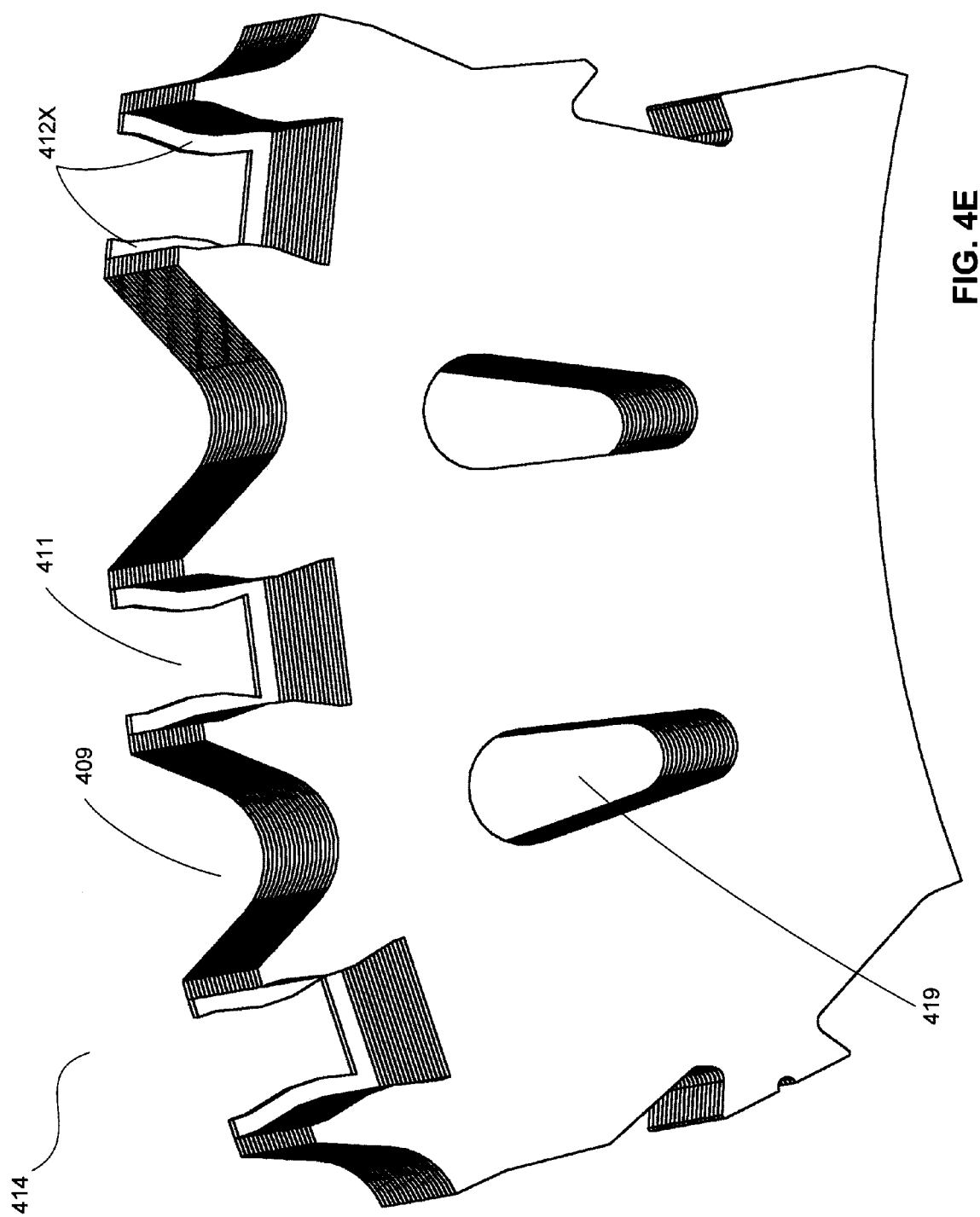

With reference now to FIGS. 4D-4E, in an exemplary embodiment a lamination stack 414 may be formed from one or more side laminations 412. In an exemplary embodiment, all side laminations 412 in a lamination stack 414 are identical. In another exemplary embodiment, one or more side laminations 412, for example side laminations 412 at an edge of lamination stack 414, may be configured with different dimensions than other side laminations in lamination stack 414. For example, a particular lamination stack 414 may comprise a side lamination 412 having extensions 412X that extend generally into the area of trench 411. In this manner, retention of an object in trench 411 may be facilitated. Additionally, extensions 412X facilitate passing additional flux into and/or out of an object placed in trench 411 due to the increased area of lamination stack 414 around trench 411.

Additional details regarding side laminations, lamination stacks, segmented lamination stacks, materials for laminations and the like may be found in U.S. patent application Ser. No. 13/291,373 entitled "TRANSVERSE AND/OR COM- MUTATED FLUX SYSTEMS HAVING SEGMENTED STATOR LAMINATIONS" having the same filing date as the present application, the contents of which are hereby incorporated by reference in their entirety.

Turning now to FIGS. 5A-5D, in accordance with various exemplary embodiments a transverse flux machine and/or commutated flux machine may utilize one or more portions formed from powdered metal or other soft magnetic composite materials, for example tooth 516. Tooth 516 may be formed from powdered metal, metallic glasses, nanocrystalline composites, and/or combinations of the same, or other suitable material having desirable magnetic and structural properties.

In an exemplary embodiment, tooth 516 has a width of about 3 mm, a height of about 5 mm, and a length of about 10.25 mm. In another exemplary embodiment, tooth 516 has a width of about 4.5 mm, a height of about 5 mm, and a length of about 10.25 mm. In various exemplary embodiments, tooth 516 is configured with a width of between about 2 mm and about 15 mm, a height of between about 2 mm and about 15 mm, and a length of between about 7 mm and about 25 mm. Moreover, tooth 516 may be configured with any suitable dimensions, geometries, and/or materials in order to facilitate switching of magnetic flux in a transverse flux machine and/or commutated flux machine.

In an exemplary embodiment, tooth 516 has a volume of about 200 cubic millimeters. In another exemplary embodiment, tooth 516 has a volume of about 150 cubic millimeters. In various exemplary embodiments, tooth 516 has a volume of between about 100 cubic millimeters and about 2 cubic centimeters. In various exemplary embodiments, tooth 516 has a mass of between about 1 gram and about 15 grams. In various exemplary embodiments, tooth 516 has a density of between about 4 grams per cubic centimeter and about 8 grams per cubic centimeter. Moreover, tooth 516 may be configured with any suitable volume, density, and/or mass in order to facilitate switching of magnetic flux in a transverse flux machine and/or commutated flux machine.

In various exemplary embodiments, tooth 516 is configured with a switching surface 516S intended to face an air gap in a transverse flux machine and/or a commutated flux machine. Switching surface 516S may be planar; alternatively, switching surface 516S may be convex and/or concave. Switching surface 516S may be configured with various lengths, widths, curves, and/or the like, as suitable. For example, in an exemplary embodiment the length and width of switching surface 516S may be selected based on dimensions of a portion of a rotor with which tooth 516 is intended to interface. For example, switching surface 516S may be configured to have a width about the same width as a flux concentrator in a rotor of a transverse flux machine. Moreover, switching surface 516S may be configured to have a width wider than the width of a flux concentrator in a rotor of a transverse flux machine.

For example, in an exemplary embodiment switching surface 516S is configured with a width about 1.2 times the width of a flux concentrator in a rotor. In another exemplary embodiment, switching surface 516S is configured with a width about 1.5 times the width of a flux concentrator in a rotor. In another exemplary embodiment, switching surface 516S is configured with a width about 1.875 times the width of a flux concentrator in a rotor. In various exemplary embodiments, switching surface 516S is configured with a width of between about 1 time to about 2 times the width of a flux concentrator in a rotor. Moreover, a desirable ratio of the width of switching surface 516S to the width of a flux concentrator in a rotor may vary, for example based on dimensions of an air gap in a transverse flux machine.

Figure 5A:
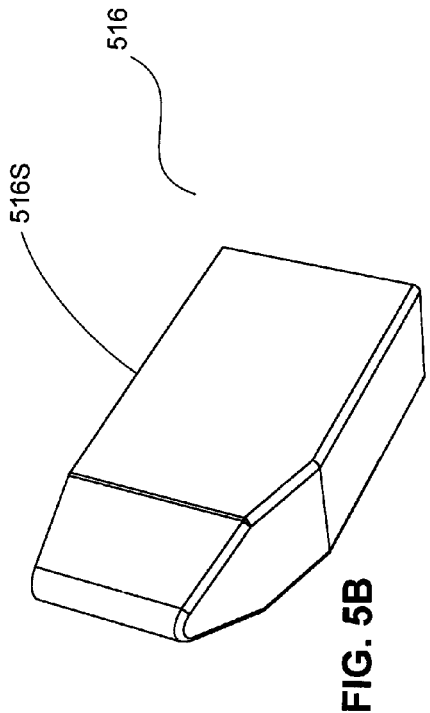
FIGS. 5A-5D illustrate stator teeth in accordance with an exemplary embodiment.
Figure 5B:
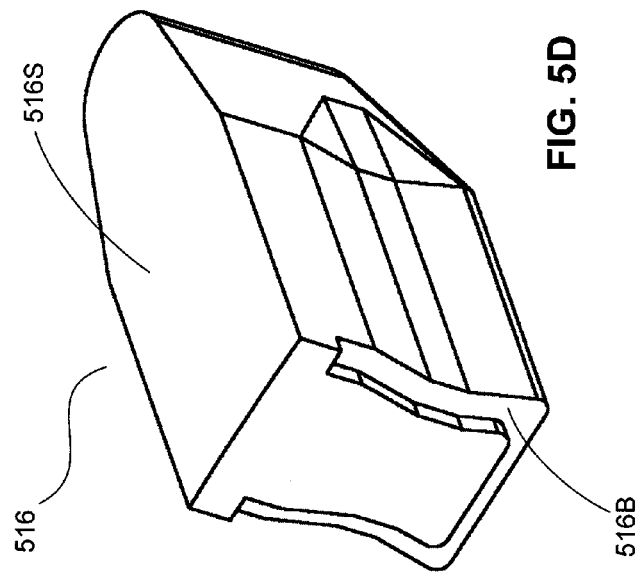
Figure 5C:
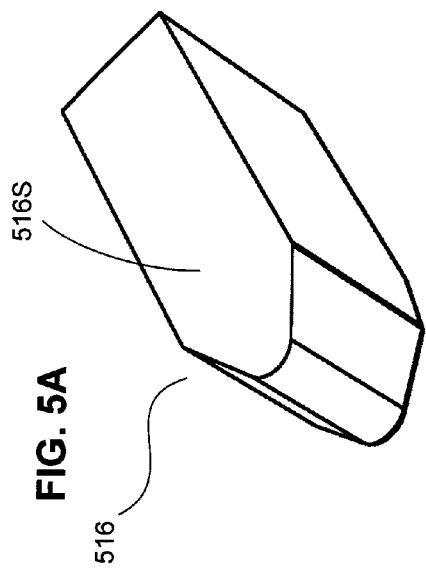
Figure 5D:
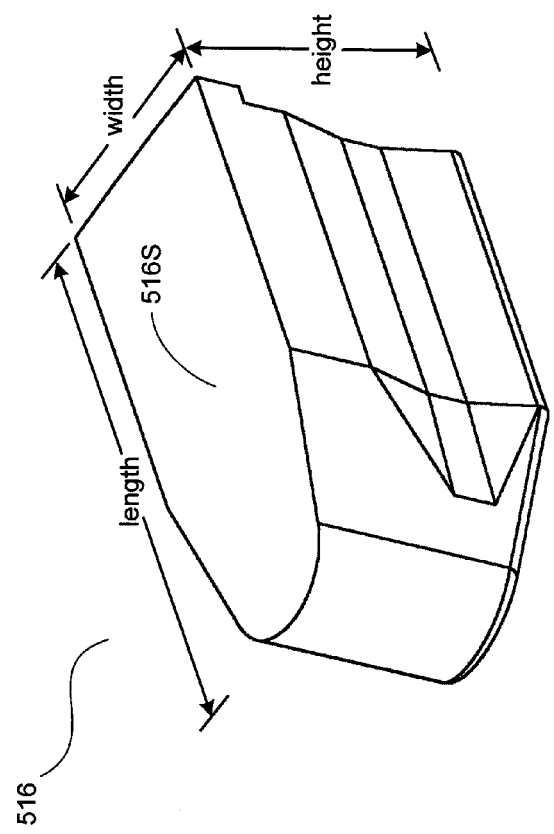
Figure 5E:
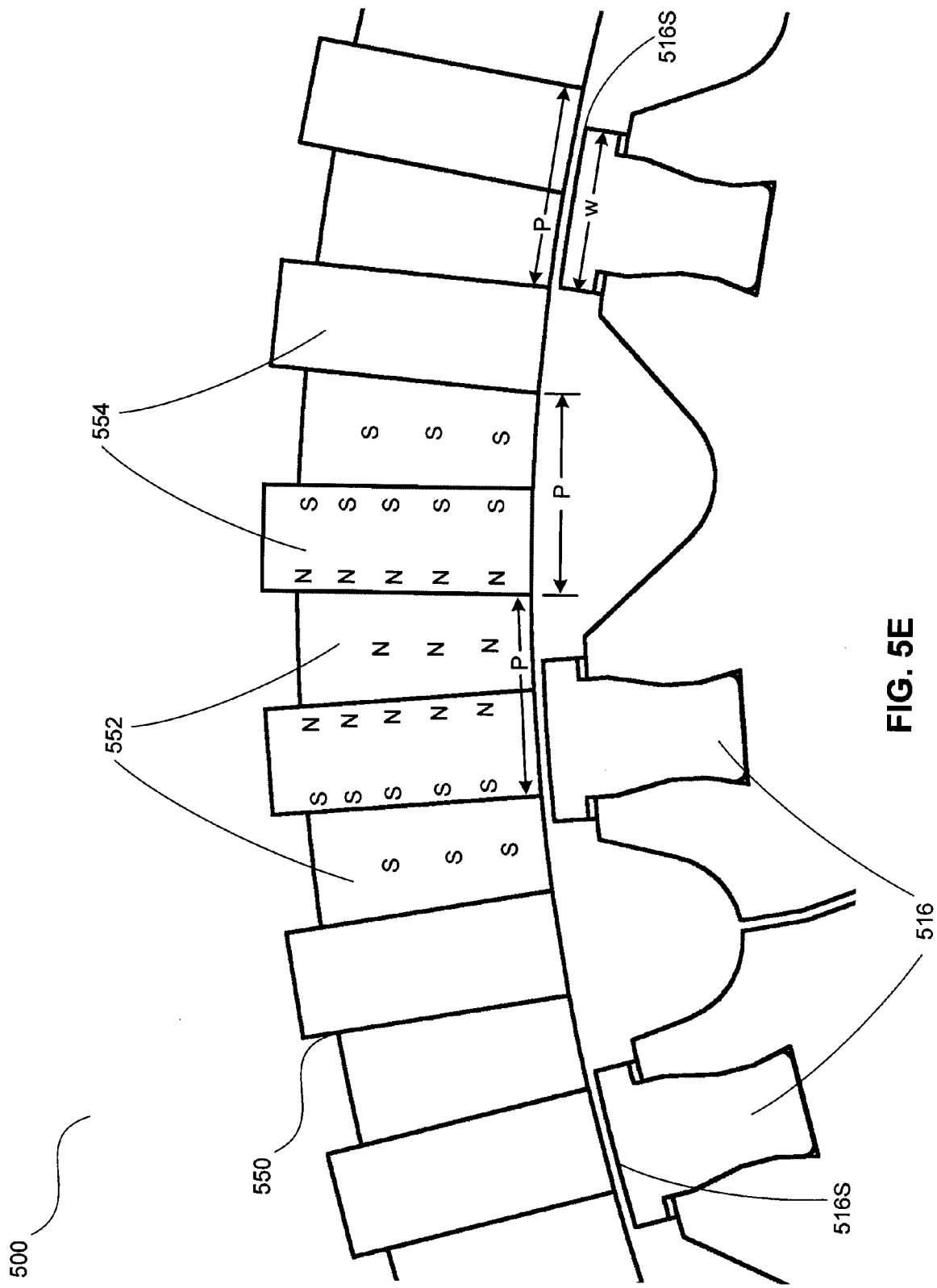
FIG. 5E illustrates stator teeth width with respect to pole pitch in accordance with an exemplary embodiment.

In various exemplary embodiments, switching surface 516S may be configured to have a desired configuration, for example a desired width, at least in part as a function of a pole pitch in a transverse flux machine and/or commutated flux machine. With reference now to FIG. 5E, in an exemplary embodiment switching surface 516S is configured with a width W related to a pole pitch P in an exemplary transverse flux machine 500. Transverse flux machine 500 comprises a rotor 550 having alternating magnets 554 and flux concentrators 552 interleaved therein. Pole pitch P is about the combined width of one magnet 554 and one flux concentrator 552. Transverse flux machine 500 further comprises a plurality of teeth 516. The width of switching surface 516S of teeth 516 may be represented as W.

In an exemplary embodiment, W is about 4.5 mm, P is about 5.7 mm, and transverse flux machine 500 is configured with 60 poles. In this exemplary embodiment, the ratio of W to P is about 0.79. In another exemplary embodiment, W is about 3 mm, P is about 4.75 mm, and transverse flux machine 500 is configured with 72 poles. In this exemplary embodiment, the ratio of W to P is about 0.63. In various exemplary embodiments, the ratio of W to P may be between about 0.5 and about 0.95. Moreover, the ratio of W to P may be selected based on one or more of a desired cogging torque in transverse flux machine 500, the diameter of rotor 550, the number of poles in transverse flux machine 500, the dimensions of an air gap in transverse flux machine 500, and/or the like, as suitable, in order to achieve one or more desired operational and/or performance characteristics of transverse flux machine 500. Moreover, stated generally, switching surface 516S may be configured to maximize the amount of flux switched between a rotor and a stator in a transverse flux machine and/or commutated flux machine.

In various exemplary embodiments, switching surface 516S may be configured for switching a sufficient amount of magnetic flux in order to saturate or nearly saturate other components of a magnetic flux path in a transverse flux machine and/or commutated flux machine. Moreover, switching surface 516S and/or other portions of tooth 516 may be configured to reduce flux leakage in a transverse flux machine and/or commutated flux machine.

In various exemplary embodiments, tooth 516 is configured to be generally rectangular in cross section at one end, and at least partially tapered in one or more dimensions toward another end. Moreover, in certain exemplary embodiments a portion of tooth 516 may be at least partially flared and/or dovetail-shaped, for example in order to facilitate mechanical, dovetail-like coupling to a lamination stack 414. Additionally, tooth 516 may be configured with various cutouts, trenches, extrusions, depressions, ridges, steps, notches, and/or other geometric features configured to allow tooth 516 to at least partially align with extensions 412X and/or other portions of a lamination stack 414. In an exemplary embodiment, with momentary reference to FIG. 5D, tooth 516 is configured with a generally U-shaped notch 516B along the rear side thereof, and U-shaped notch 516B aligns with extensions 412X in a lamination stack 414. In this manner, tooth 516 may be retained in trench 411 in lamination stack 414.

The shape of tooth 516 may be configured to maximize the engagement and transfer of flux over a mating surface of tooth 516, for example over switching surface 516S (where flux may be received from and/or transferred to a rotor), over the "bottom" (e.g., the side of tooth 516 opposite switching surface 516S, where flux may be received from and/or transferred to lamination stack 414) and/or the sides of tooth 516 (where flux may be received from and/or transferred to lamination stack 414).

Moreover, the shape of tooth 516 may be configured to maximize the engagement of flux over a mating surface of tooth 516 while generating a flow of flux around a coil in a desired direction. In various exemplary embodiments the shape of tooth 516 is configured to reduce hysteresis losses in a rotor, for example by extending a desired axial distance along a flux concentrator in a rotor. Additionally, in various exemplary embodiments, the shape of tooth 516 contributes to reduced eddy current losses in a coil, for example by at least partially shielding the coil from flux switching across an air gap in a transverse flux machine and/or commutated flux machine. In an exemplary embodiment, the shape of tooth 516 is selected to produce an electrical machine with a high torque density, for example by acting as a flux concentrator for flux transferred through lamination stack 414. Additionally, the shape of tooth 516 may be selected to produce an electrical machine with a smaller physical footprint, such as a reduced length along the axis of rotation of a transverse flux machine, by shortening the length of tooth 516. Yet further, the shape of tooth 516 may be configured to reduce cogging torque in a transverse flux machine and/or commutated flux machine.

Figure 6A:
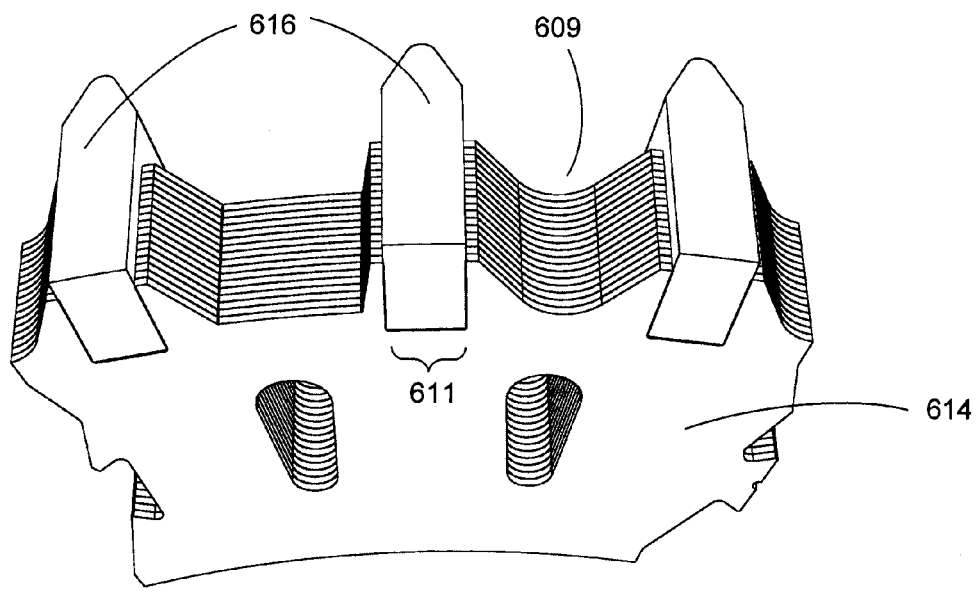
FIGS. 6A and 6B illustrate a lamination stack having teeth coupled thereto in accordance with an exemplary embodiment.
Figure 6B:
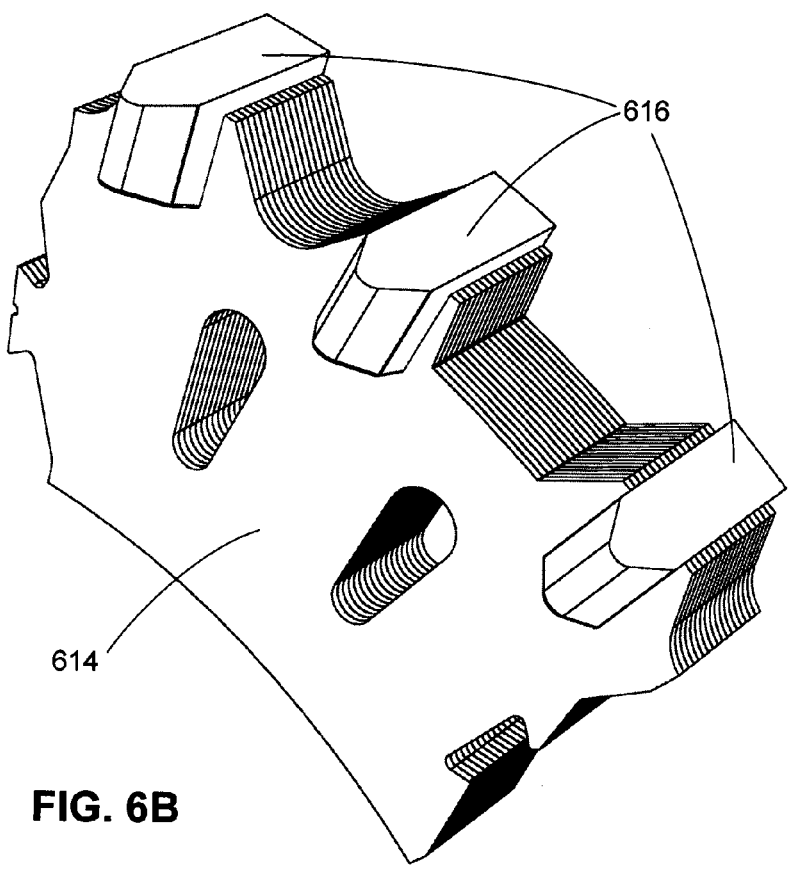
Figure 6C:
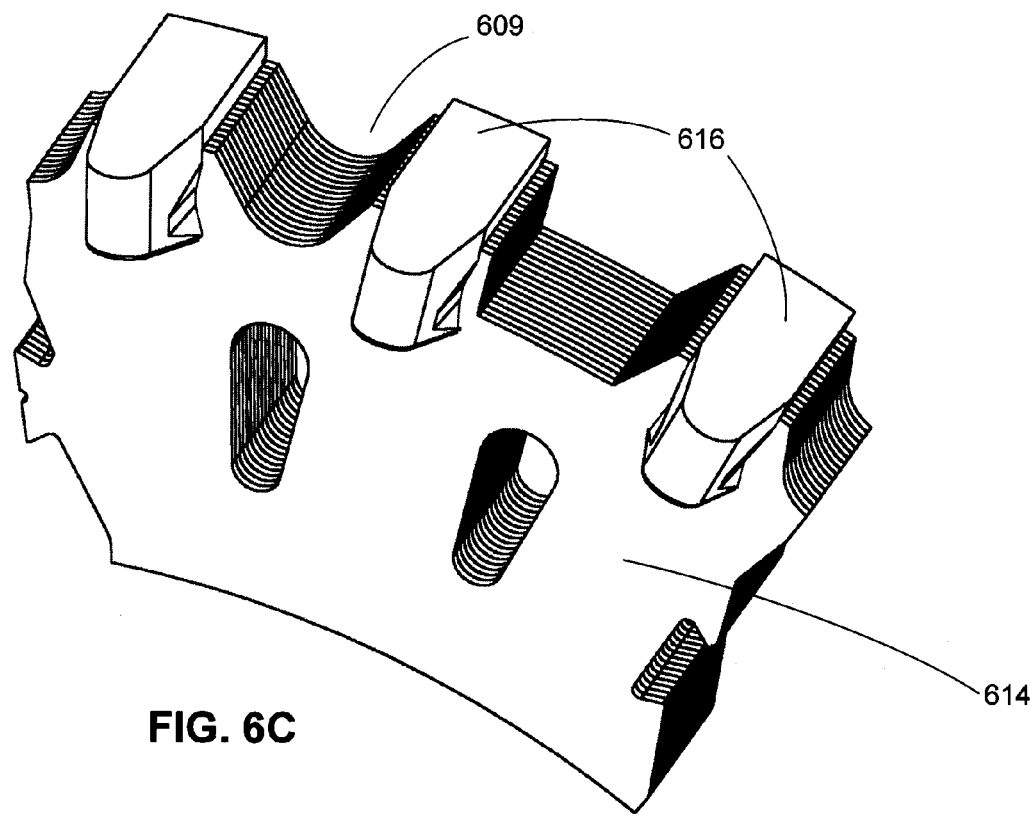
FIGS. 6C and 6D illustrate a lamination stack having teeth coupled thereto in a dovetail fashion in accordance with an exemplary embodiment.
Figure 6D:
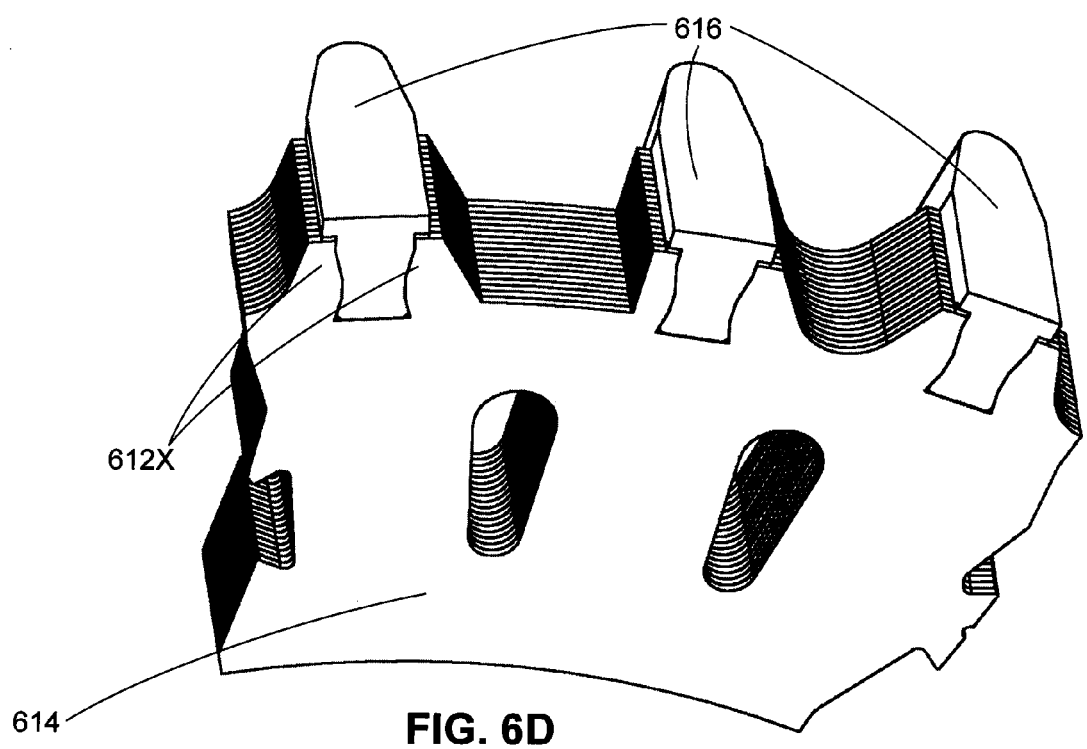

Turning now to FIGS. 6A-6D, in accordance with various exemplary embodiments a tooth 616 may be placed in a trench 611 in a lamination stack 614. In an exemplary embodiment, one end of tooth 616 (e.g., a generally rectangular end) may be set generally flush with one side of lamination stack 614, and another end of tooth 616 (e.g., a generally tapered end) may extend beyond the other side of lamination stack 614 (as illustrated in FIGS. 6A and 6B). In another exemplary embodiment, one end of tooth 616 (e.g., an end having generally U-shaped notch 516B thereon, for example generally U-shaped notch 516B illustrated in FIG. 5D) may be set generally flush with one side of lamination stack 614, and another end of tooth 616 (e.g., a generally tapered end) may extend beyond the other side of lamination stack 614 (as illustrated in FIGS. 6C and 6D). In this exemplary embodiment, tooth 616 is set generally flush with one side of lamination stack 614 due to the complimentary geometries of notch 516B and extensions 612X. Moreover, tooth 616 may be coupled to lamination stack 614 and/or aligned with respect to lamination stack 614 in any suitable manner and/or configuration.

Figure 6E:
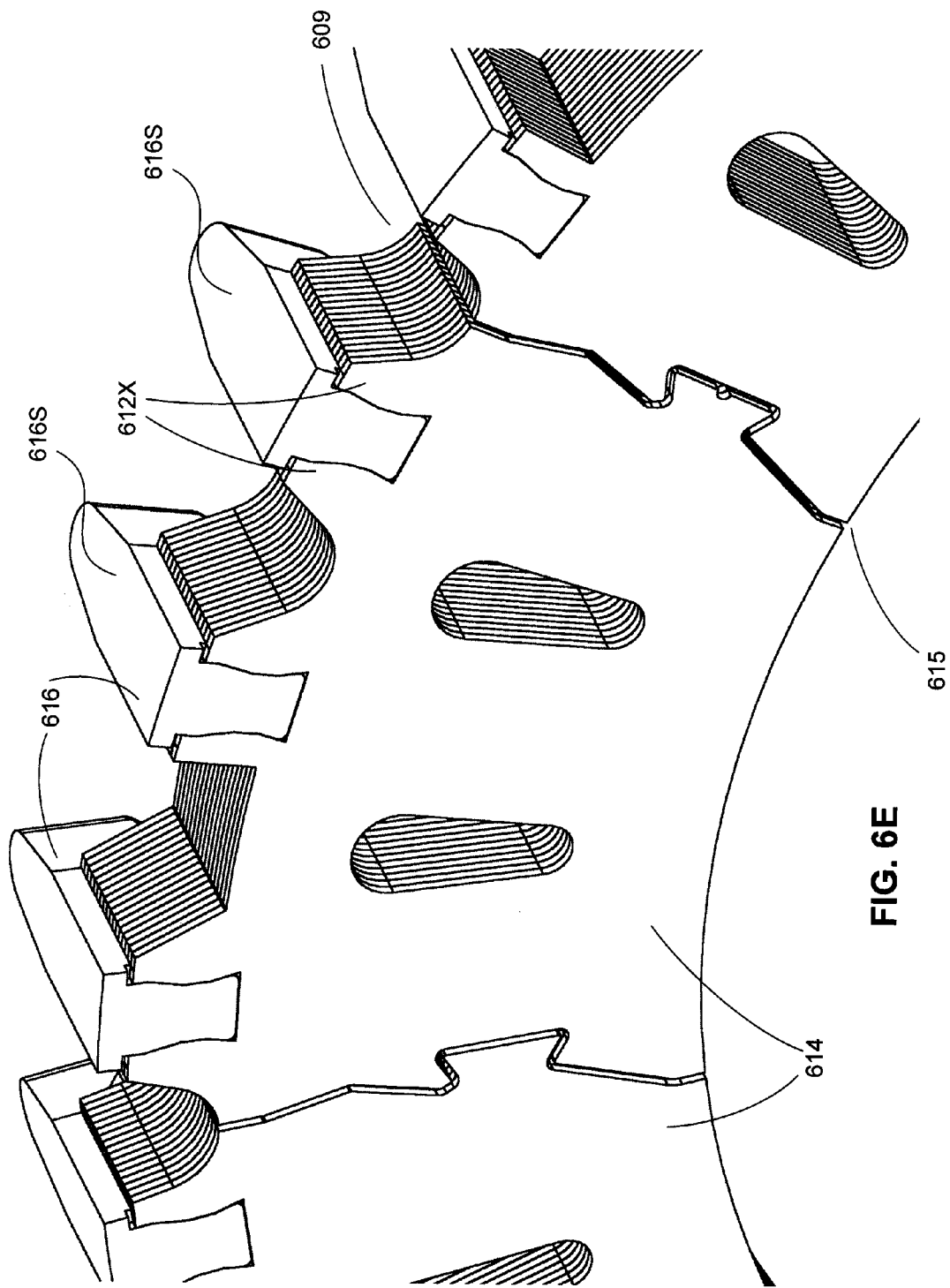
FIG. 6E illustrates a close-up view of multiple lamination stacks having teeth coupled thereto, the multiple lamination stacks coupled to form a generally ring-shaped stator half in accordance with an exemplary embodiment.

With reference now to FIG. 6E, in various exemplary embodiments multiple lamination stacks 614 may be utilized to form a generally ring-shaped structure. Teeth 616 are placed in trenches 611 in the lamination stacks 614, resulting in a generally ring-shaped structure having multiple switching surfaces 616S disposed along an edge thereof, for example along an outer edge and/or along an inner edge. In various exemplary embodiments, switching surfaces 616S disposed generally along an outer edge may desirably be utilized in a transverse flux machine and/or commutated flux machine having an outer rotor (i.e., a rotor that at least partially surrounds a stator). In various other exemplary embodiments, switching surfaces 616S disposed generally along an inner edge may desirably be utilized in a transverse flux machine and/or commutated flux machine having an inner rotor (i.e., a rotor that is at least partially surrounded by a stator). In the ring-shaped structure, switching surfaces 616S may be disposed to generally face the radial interior of the ring (for example, in connection with the use of an "inner" rotor in an axial gap configuration), the radial exterior of the ring (for example, in connection with the use of an "outer" rotor in an axial gap configuration), and/or an axial side of the ring (for example, in connection with the use of a rotor in a "side by side" rotor in a radial gap configuration). As used herein, a generally ring-shaped structure or other suitable structures composed of lamination stacks 614 and/or teeth 616 may be referred to as a "stator half". Lamination stacks 614 comprising a stator half may be separated by cuts, for example interlocking cuts 615 having a suitable width, such as a width of about 0.03 inches, in order to reduce losses.

In various exemplary embodiments, cuts 615 may be configured to interlock portions of adjacent lamination stacks 614, for example as illustrated in FIG. 6E. In other exemplary embodiments, with reference now to FIG. 6F, cuts 615 may be configured to allow portions of a lamination stack 614 to at least partially interlock with other components, for example components configured to couple laminations stacks 614 together. Stated differently, in various exemplary embodiments, lamination stacks 614 may at least partially interlock or couple to one another; in other exemplary embodiments, lamination stacks 614 may at least partially interlock or couple to other components disposed between and/or linking lamination stacks 614.

Figure 6F:
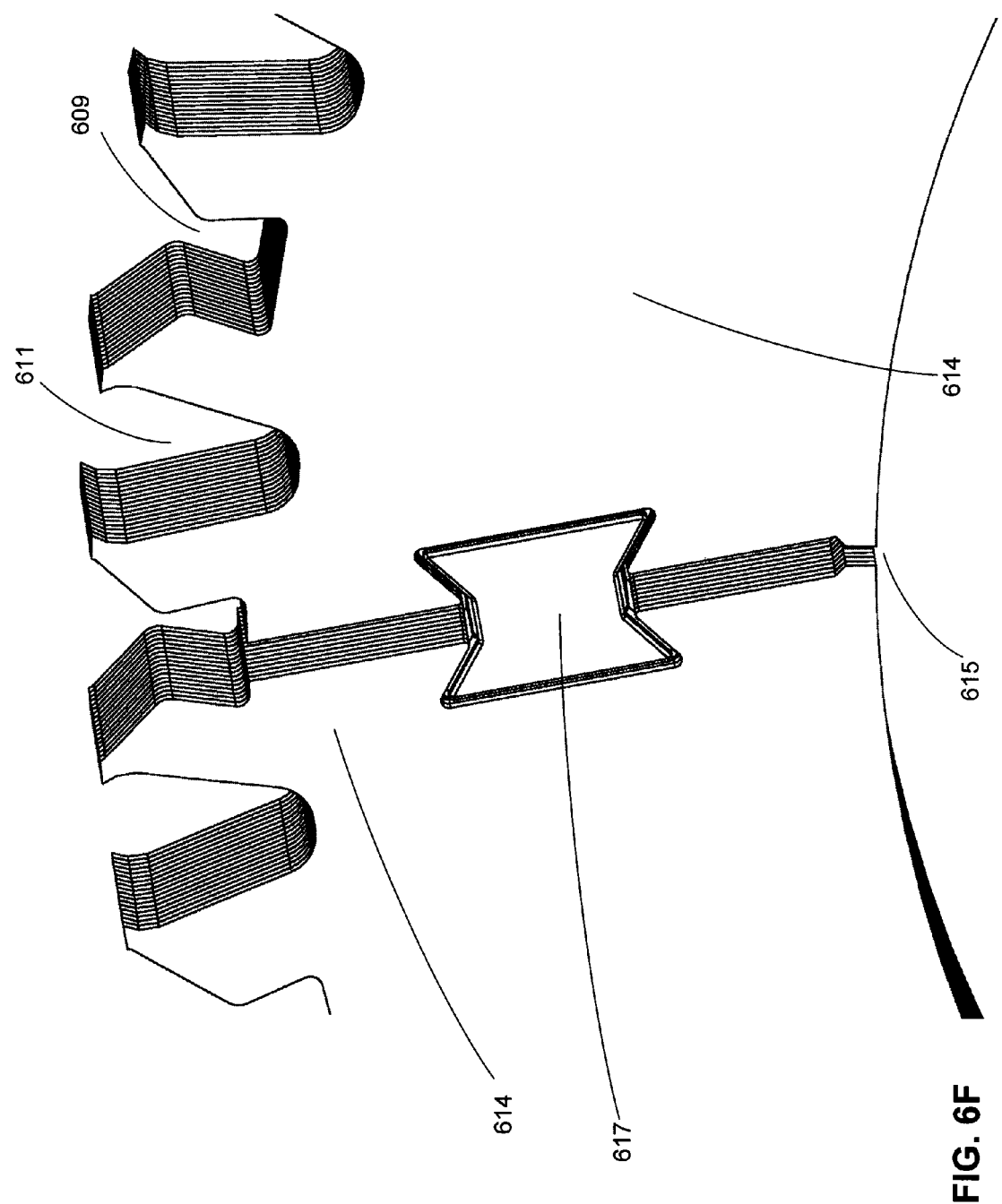
FIG. 6F illustrates a close-up view of multiple lamination stacks configured with cuts providing features for mechanical connection between lamination stacks in accordance with an exemplary embodiment.

In an exemplary embodiment, portions of cuts 615 in lamination stack 614 define generally "female" portions of lamination stack 614. A non-magnetic coupling component, for example a "double dovetail"-like insert 617 configured with two "male" portions, may then be coupled to the corresponding female portions of adjacent lamination stacks 614 order to couple adjacent lamination stacks 614. It will be appreciated that the respective location of male and female portions on lamination stack 614 and inserts 617 may also be reversed, as suitable. Moreover, any suitable combination of male and female portions may be utilized, as desired. While a dovetail-like interlocking is illustrated in FIG. 6F, it will be appreciated that various other interlocking and/or partially interlocking configurations and shapes may be utilized, as suitable. Moreover, inserts 617 may be formed from liquid crystal polymer, glass-filled engineering plastic, ceramic, electrically insulated and/or coated metal, and/or other suitable structural materials or combinations thereof.

Moreover, multiple lamination stacks 614 may be coupled together via the use of various non-magnetic coupling components such as inserts 617, for example in order to form a generally ring-shaped structure. Stated generally, cuts 615 may be configured to provide features for mechanical connection between lamination stacks 614, and/or between lamination stacks 614 and other components of a transverse flux machine and/or commutated flux machine, for example inserts 617.

In various exemplary embodiments, with continued reference to FIG. 6F, trenches 611 in lamination stack 614 may be separated by grooves 609. Grooves 609 may be configured with portions and/or edges that are concave, convex, curved, linear, angular, and/or combinations of the same. In various exemplary embodiments, grooves 609 are configured to be at least partially "hourglass" shaped, for example as illustrated in FIG. 6F. In this manner, grooves 609 may assist in mechanically retaining objects and/or material placed therein. For example, grooves 609 may be filled with epoxy or other adhesive during manufacturing of a particular transverse flux machine and/or commutated flux machine. After curing, the "hourglass" shape of grooves 609 resists mechanical separation of the cured adhesive from lamination stack 614, for example responsive to rotational, vibrational, or other forces in the transverse flux machine and/or commutated flux machine. Additionally, grooves 609 may facilitate coupling of lamination stack 614 to other components of a transverse flux machine and/or commutated flux machine.

Figure 7B:
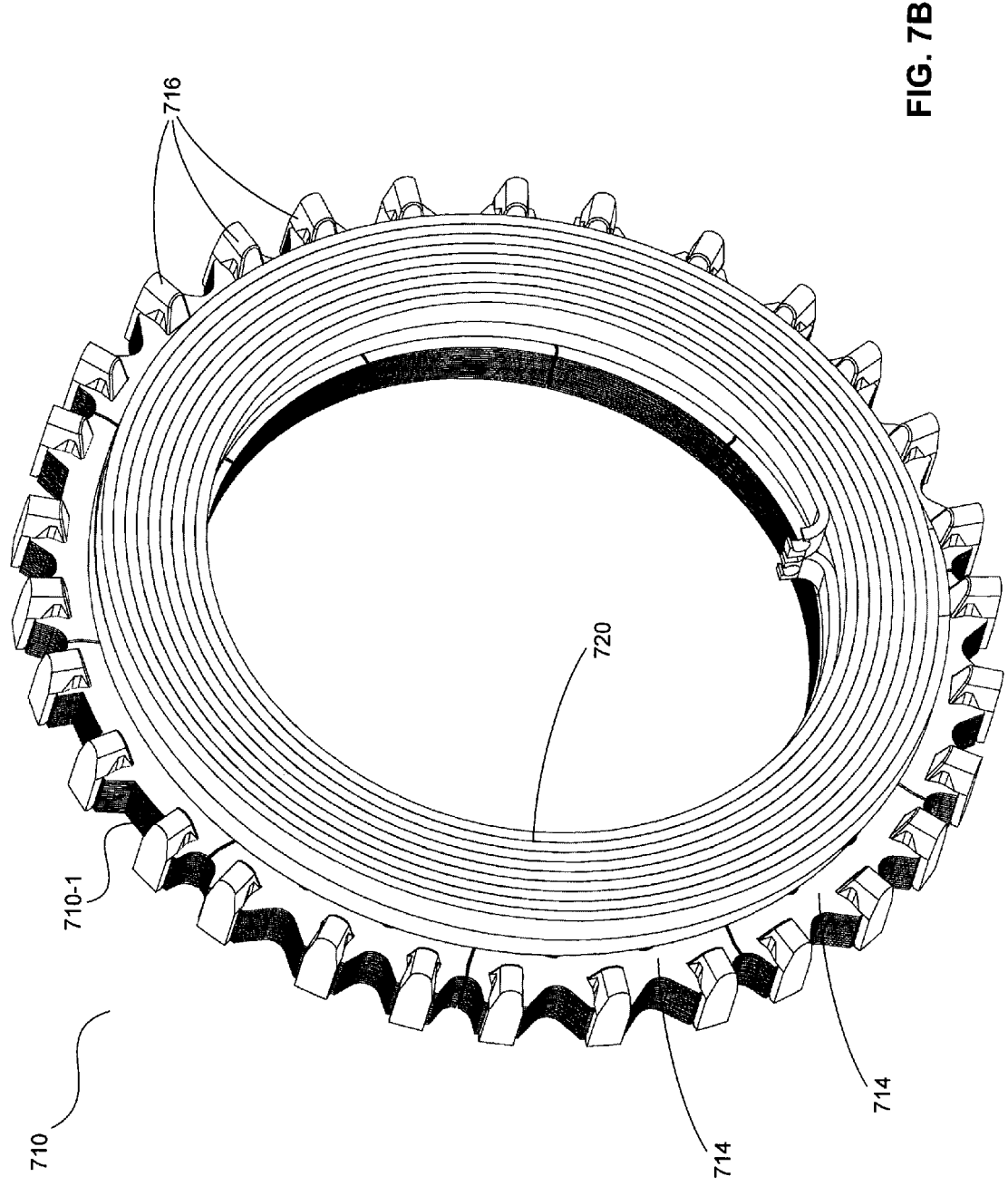
FIG. 7B illustrates a stator half and a dual-wound coil in accordance with an exemplary embodiment.
Figure 7C:
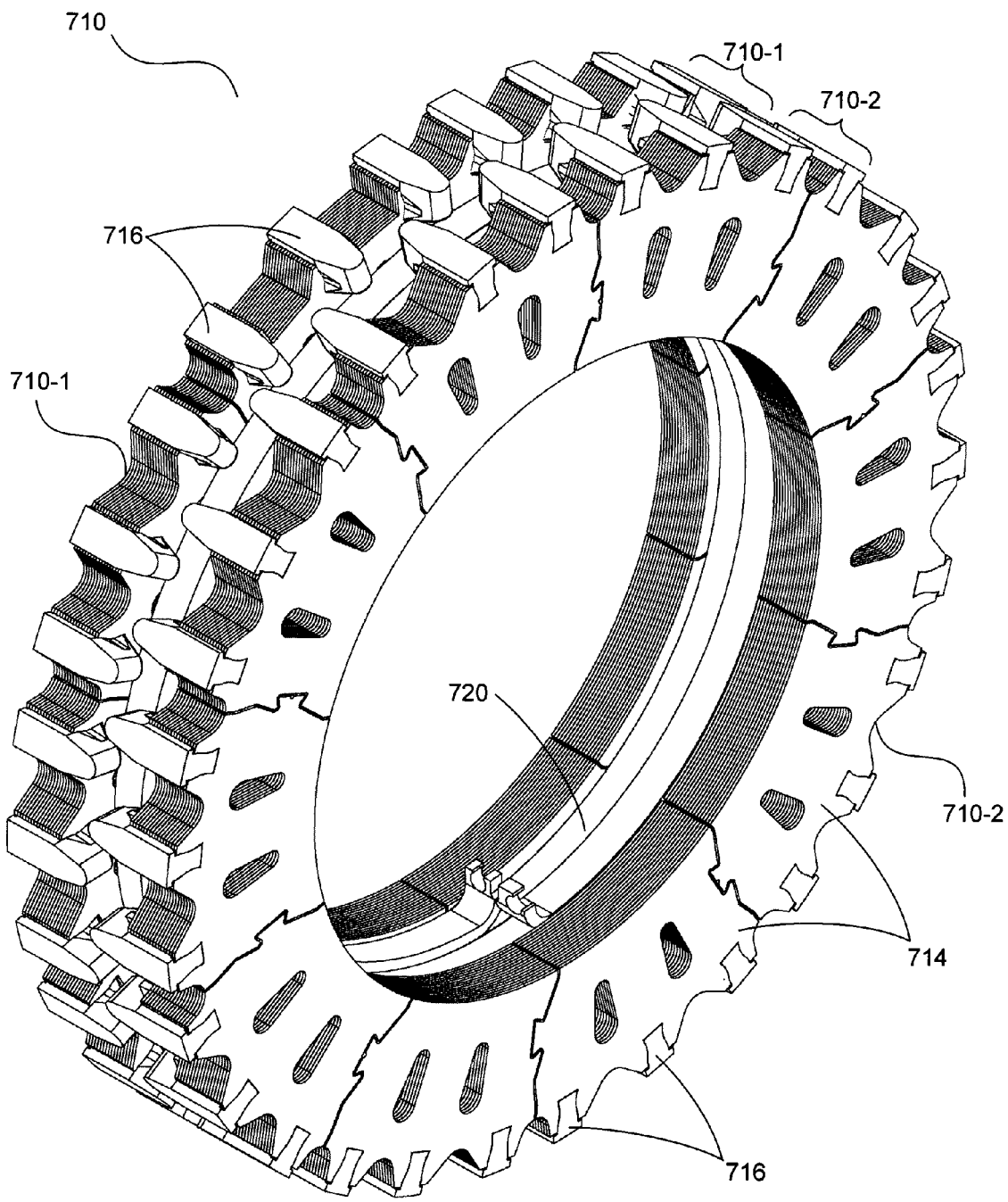
FIG. 7C illustrates a stator assembly comprising two stator halves at least partially surrounding a dual-wound coil in accordance with an exemplary embodiment.

In an exemplary embodiment, turning now to FIGS. 7A-7C, a first stator half 710-1 and a second stator half 710-2 may be utilized to form at least a portion of a stator assembly 710 for a transverse flux machine. Stator half 710-1 and 710-2 are placed with a coil 720 therebetween. Coil 720 may be a dual wound coil. Stator half 710-1 and 710-2 face one another, with tapered portions of teeth 716 extending into the gap therebetween. Stator half 710-1 and 710-2 are rotationally aligned to a desired position with respect to one another, for example in order to provide a desired timing for flux switching in stator assembly 710, to provide sufficient spacing between teeth 716 of stator half 710-1 and teeth 716 of stator half 710-2 in order to reduce flux leakage therebetween, to implement a sixth-phase offset, and/or the like.

With additional reference now to FIG. 7D, in various exemplary embodiments stator assembly 710 is configured as a polyphase stator assembly having phases 710A, 710B, and 710C. Each stator phase comprises a first stator half (for example, stator half 710-1) and a second stator half (for example, stator half 710-2) with a coil therebetween (for example, coil 720). Flux paths between a first stator half and a second stator half may be provided by one or more back return laminations 718. Back return laminations 718 may comprise any suitable flux conducting material and/or materials, such as steel, silicon steel, amorphous metals, metallic glass alloys, powdered metals such as powdered iron, and/or the like. Moreover, flux paths within polyphase stator assembly 710 may be provided via any suitable components, structures, and/or materials in order to facilitate switching of magnetic flux around one or more coils.

Additional details regarding back return laminations are disclosed in U.S. patent application Ser. No. 13/291,373 entitled "TRANSVERSE AND/OR COMMUTATED FLUX SYSTEMS HAVING SEGMENTED STATOR LAMINATIONS" having the same filing date as the present application, the contents of which are hereby incorporated by reference in their entirety.

Figure 7E:
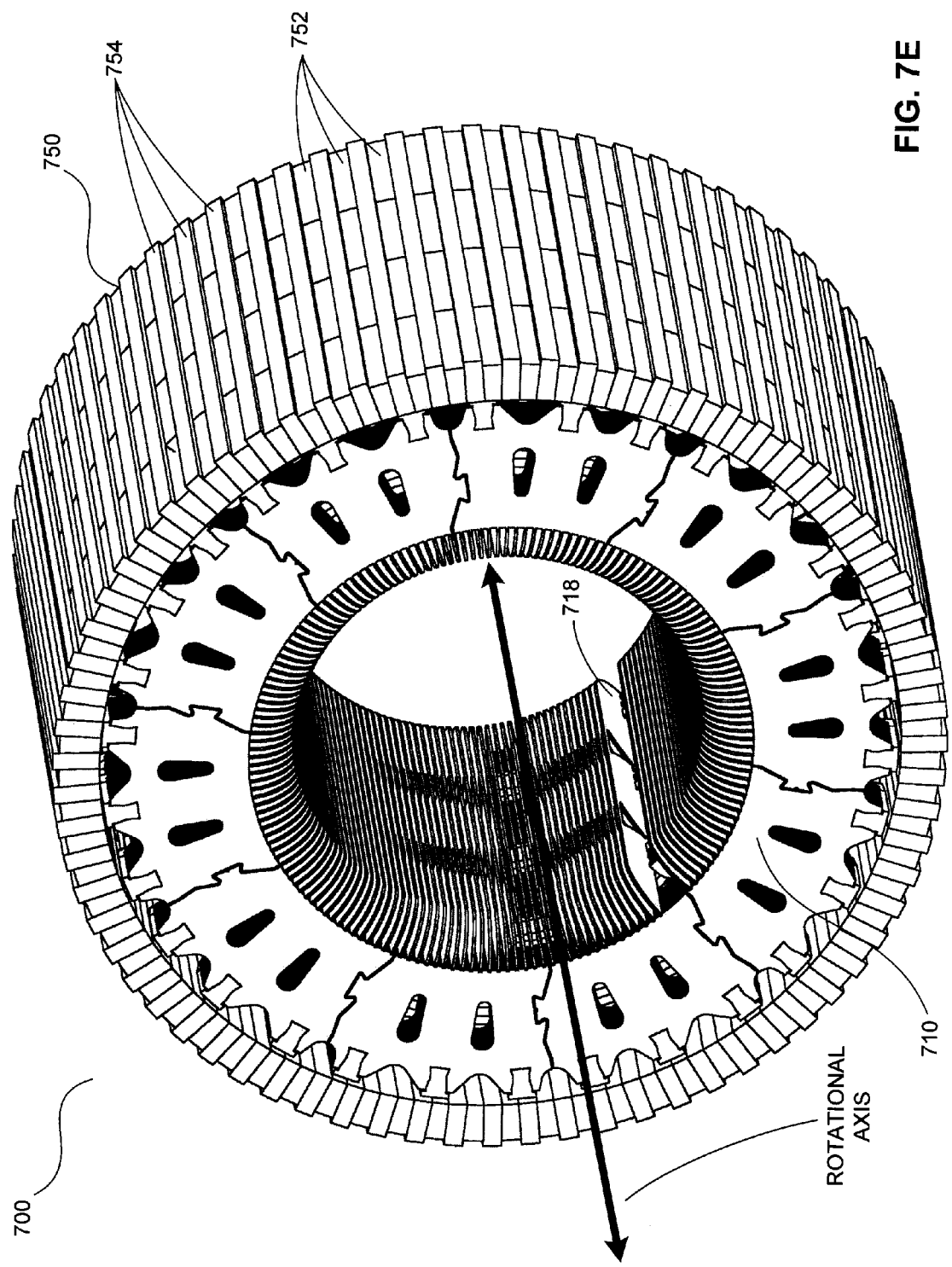
FIG. 7E illustrates a polyphase transverse flux machine in accordance with an exemplary embodiment.

In an exemplary embodiment, with reference now to FIGS. 7D and 7E, an exemplary polyphase transverse flux machine 700 comprises polyphase stator assembly 710 and rotor 750. Rotor 750 comprises at least one flux concentrator 752 and at least one magnet 754, each of which may comprise any suitable shape. In an exemplary embodiment, both flux concentrator 752 and magnet 754 are substantially rectangular in three dimensions. In other exemplary embodiments, flux concentrator 752 and magnet 754 are tapered. In various exemplary embodiments, rotor 750 comprises a generally ring-shaped structure comprised of alternating magnets 754 and flux concentrators 752.

In rotor 750, magnets 754 may be configured to be "extended" with respect to flux concentrators 752, for example by magnets 754 extending a first distance in a direction away from a coil in transverse flux machine 700 while flux concentrators 752 extend a second, shorter distance in the direction away from the coil. Moreover, rotor 750 may be configured to be at least partially overhung with respect to polyphase stator assembly 710, for example by overhanging a first side of polyphase stator assembly 710 and a second side of polyphase stator assembly 710 in a direction parallel to an air gap between rotor 750 and polyphase stator assembly 710. Additional details regarding extended magnets and/or overhung rotors are disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

When transverse flux machine 700 is operated as a motor, responsive to a polyphase input current (for example, an AC input current differing in phase in each of dual wound coils 720A, 720B, and 720C, rotor 750 is driven to rotate with respect to polyphase stator assembly 710. When transverse flux machine 700 is operated as a generator, responsive to a mechanical force causing rotor 750 to rotate, an AC output current is induced in each of dual wound coils 720A, 720B, and 720C.

In various exemplary embodiments, transverse flux machine 700 is configured with a voltage constant $K_E$ (also referred to as back EMF constant) of between about 0.06 to about 0.3 in each phase in polyphase stator assembly 710, when $K_E$ is calculated as (volts phase-to-phase)/(RPMs). In certain exemplary embodiments, transverse flux machine 700 having a particular diameter is configured with a voltage constant $K_E$ of between about 0.03 to about 0.5. In contrast, various prior art electric motors having a similar diameter, for example electric motors configured for use as bicycle motors, are configured with a voltage constant $K_E$ of about 0.03 to about 0.015. Because transverse flux machine 700 may be configured with a higher voltage constant $K_E$ compared to various prior motors, transverse flux machine 700 can offer improved performance. Moreover, voltage constants in electrical machines may vary based at least in part on the diameter and/or width of an electrical machine. As such, the examples provided above are illustrative and not exhaustive.

In various exemplary embodiments, when transverse flux machine 700 is configured with three phases (each phase having an axial thickness of about 20 mm, for a total axial thickness of about 60 mm), and a diameter of about 120 mm, transverse flux machine 700 is configured with a motor constant $K_M$ of between about 3 Newton-meters per root watt (Nm/√W) and about 5 Newton-meters per root watt. In various other exemplary embodiments, when transverse flux machine 700 is configured with three phases (each phase having an axial thickness of about 35 mm, for a total axial thickness of about 105 mm), and a diameter of about 330 mm, transverse flux machine 700 is configured with a motor constant $K_M$ of between about 24 Newton-meters per root watt and about 36 Newton-meters per root watt Moreover, motor constants in electrical machines may vary based at least in part on the diameter of an electrical machine. As such, the examples provided above are illustrative and not exhaustive.

Because transverse flux machines and/or commutated flux machines configured in accordance with principles of the present disclosure, for example transverse flux machine 700, may be configured with a higher motor constant $K_M$ compared to various prior motors of similar diameters and number of phases, transverse flux machine 700 can offer improved performance. For example, transverse flux machine 700 can provide for extended operational times and/or vehicle ranges for a particular battery, use of less expensive battery chemistries having lower peak current draw capability (as transverse flux machine 700 often requires a lower current to produce a particular output torque when compared to various prior motors of similar diameters and number of phases), reduced and/or eliminated cooling components due to reduced thermal losses, and/or the like.

In various exemplary embodiments, transverse flux machine 700 is configured with between about 12 turns and about 24 turns in each of dual wound coils 720A, 720B, and 720C. In an exemplary embodiment, transverse flux machine 700 is configured to achieve an output torque of about 10

Newton-meters at a current level of about 100 amp-turns in each of dual wound coils 720A, 720B, and 720C. In another exemplary embodiment, transverse flux machine 700 is configured to achieve an output torque of about 5 Newton-meters at a current level of about 100 amp-turns in each of dual wound coils 720A, 720B, and 720C.

Yet further, in an exemplary embodiment, transverse flux machine 700 is configured to achieve an output torque of about 88 Newton-meters at a current level of about 1000 amp-turns in each of dual wound coils 720A, 720B, and 720C. In another exemplary embodiment, transverse flux machine 700 is configured to achieve an output torque of about 45 Newton-meters at a current level of about 1000 amp-turns in each of dual wound coils 720A, 720B, and 720C. Moreover, in various exemplary embodiments, transverse flux machine 700 is configured to achieve an output torque of between about 2 Newton-meters and about 50 Newton-meters at a current level of between about 50 amp-turns and about 500 amp-turns in each of dual wound coils 720A, 720B, and 720C. In certain exemplary embodiments, transverse flux machine 700 is configured to operate at a current level of between about 1 amp-turn and about 3000 amp-turns in each of dual wound coils 720A, 720B, and 720C.

Figure 8A:
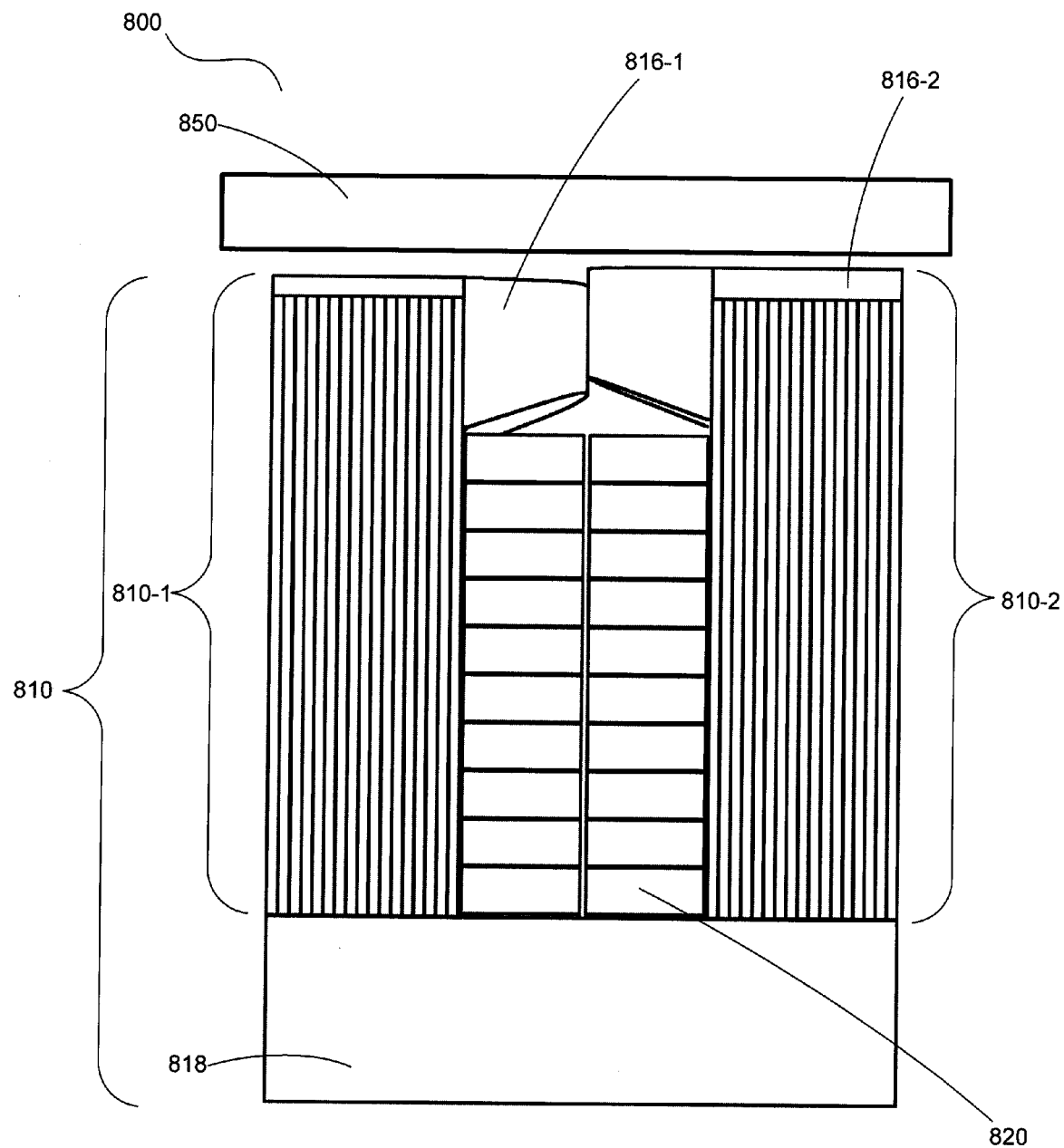
FIG. 8A illustrates an exemplary transverse flux machine in accordance with an exemplary embodiment.
Figure 8B:
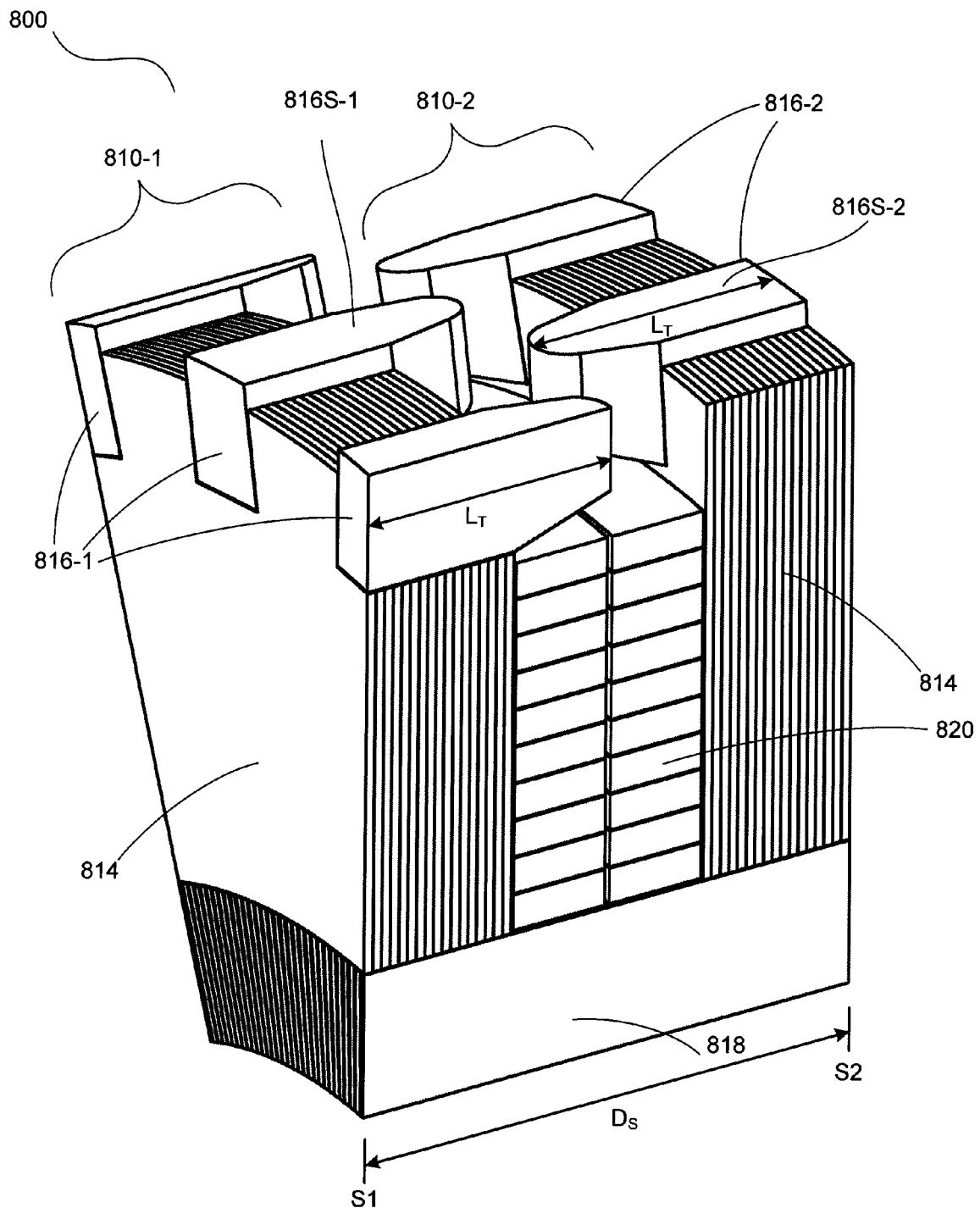
FIG. 8B illustrates an exemplary transverse flux machine in accordance with an exemplary embodiment.
Figure 8C:
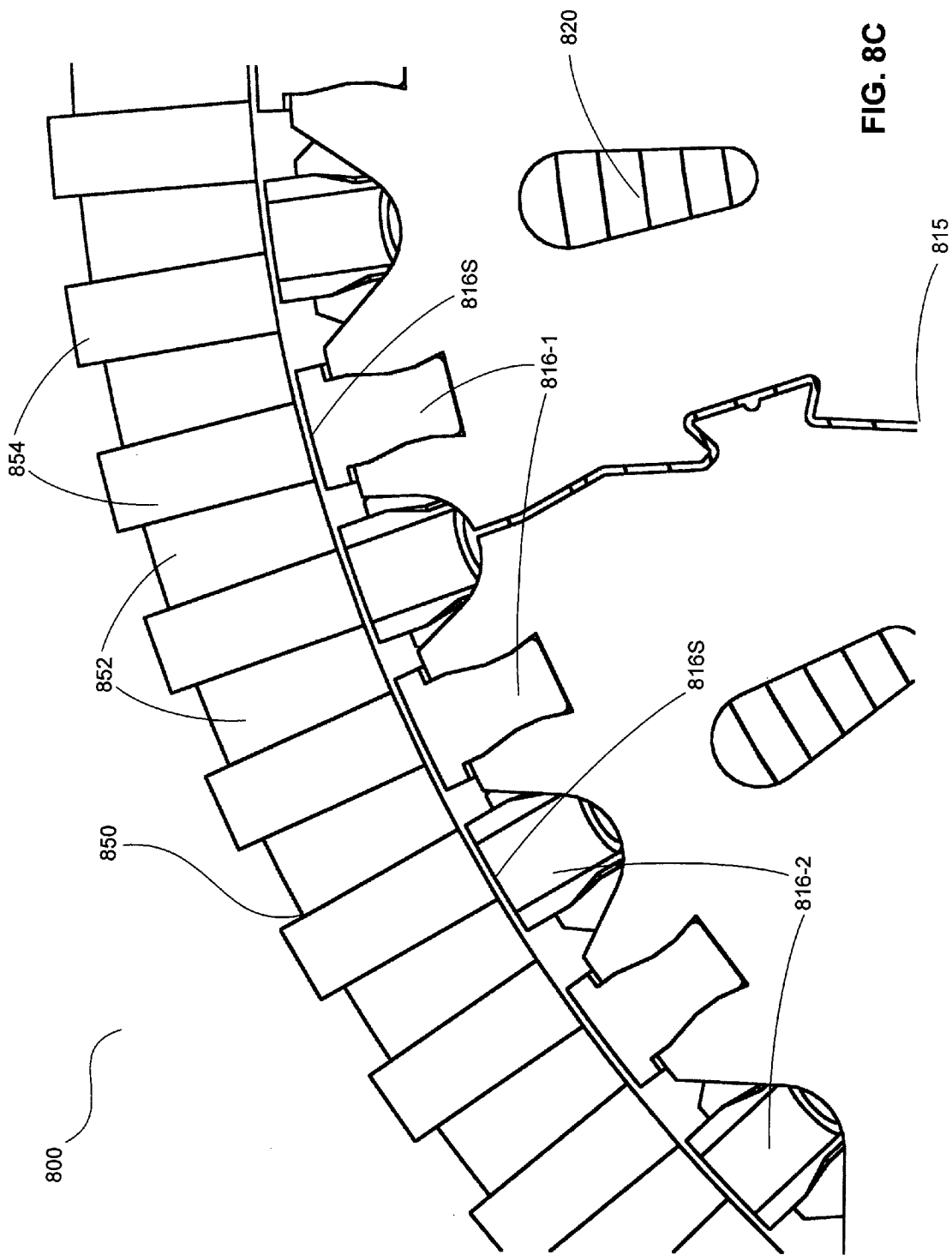
FIG. 8C illustrates a side view of an exemplary transverse flux machine in accordance with an exemplary embodiment.

Turning now to FIGS. 8A-8C, in accordance with various exemplary embodiments, an electrical machine, for example transverse flux machine 800, generally comprises a rotor 850, a stator assembly 810, and a coil 820. Moreover, transverse flux machine 800 may comprise multiple stator assemblies 810. For example, transverse flux machine 800 may comprise a single rotor 850, one or more coils 820, and one or more stator assemblies 810. Moreover, via use of a plurality of stator assemblies 810, transverse flux machine 800 may be configured to produce polyphase output and/or operate responsive to polyphase input, for example when each stator assembly 810 corresponds to a different phase.

Stator assembly 810 may be configured with any suitable shapes, geometries, and/or dimensions configured to facilitate the flow of flux around coil 820. In one exemplary embodiment, stator assembly 810 comprises stator half 810-1 and stator half 810-2. Stator half 810-1 and stator half 810-2 are coupled by one or more back return laminations 818 to provide flux paths around coil 820. In an exemplary embodiment, stator assembly 810 is configured to interface with rotor 850 in a face engaged configuration. In another exemplary embodiment, stator assembly 810 is configured to be cavity engaged with rotor 850.

In an exemplary embodiment, with reference again to FIG. 8A, stator assembly 810 may at least partially enclose coil 820. Coil 820 may be any suitable height, width, and/or length to generate an electrical current responsive to flux switching in stator assembly 810 and/or rotor 850. Coil 820 may also be any suitable height, width, and/or length configured to receive a current to drive rotor 850. In one exemplary embodiment, the interior surface of stator assembly 810 may be configured to generally mirror the shape and size of the exterior of coil 820. In another exemplary embodiment, stator assembly 810 may be configured to be slightly larger than coil 820. Moreover, in another exemplary embodiment, stator assembly 810 is "wrapped" around coil 820 so that the interior surface of stator assembly 810 is slightly larger than the height and width of coil 820 with a minimized gap between coil 820 and stator assembly 810. Coil 820 may have any suitable length, diameter and/or other dimensions and/or geometries, as desired. In an exemplary embodiment, coil 820 is substantially circular about an axis of rotation.

Coil 820 may have any suitable length, diameter and/or other dimensions and/or geometries, as desired. In an exemplary embodiment, coil 820 is substantially circular about an axis of rotation of transverse flux machine 800. In an exemplary embodiment, coil 820 is coupled to an interior surface of stator assembly 810. Coil 820 may be desirably spaced away from and/or magnetically insulated from rotor 850 and/or stator assembly 810. For example, coil 820 may be desirably spaced away from and/or magnetically insulated from rotor 850 and/or stator assembly 810 in order to reduce eddy currents and/or other induced effects in coil 820 responsive to flux switching.

In an exemplary embodiment, coil 820 is electrically coupled to a current source. The current source may be any suitable current source, but in various exemplary embodiments, the current source is alternating current.

In an exemplary embodiment, coil 820 is generally constructed from copper. However, coil 820 may be made out of any suitable electrically conductive material and/or materials such as silver, gold, aluminum, superconducting materials, and/or the like. Furthermore, coil 820 may be one solid piece, or may be made by coiling, layering, stacking, and/or otherwise joining many smaller strands or wires of electrically conductive material and/or low-loss materials together. In various exemplary embodiments, coil 820 may be dual wound, edge-wound or flat-wound, as suitable, in order to reduce eddy currents and/or other losses. Additional details regarding exemplary coil shapes and configurations are disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", and in U.S. patent application Ser. No. 13/291,385 entitled "TRANSVERSE AND/OR COMMUTATED FLUX SYSTEM COIL CONCEPTS" having the same filing date as the present application, the contents of each which are hereby incorporated by reference in their entirety.

In accordance with an exemplary embodiment, stator assembly 810 and rotor 850 interact to create a magnetic flux circuit. Flux conduction is created, for example, by the switching opposite pole flux concentrators 852 of rotor 850 approaching switching surfaces 816S of teeth 816 in stator half 810-1 and 810-2 (e.g., switching surfaces 816S-1 and 816S-2). In an exemplary embodiment, opposite pole flux concentrators 852 are adjacent and interleaved in rotor 850. In various exemplary embodiments, a flux path is created through the switching elements of stator assembly 810. In an exemplary embodiment, AC synchronous flux flow is generated in response to similar flux conduction and flux paths being created simultaneously in adjacent flux concentrators 852. In another exemplary embodiment, asynchronous flux flow is generated in response to flux conduction and flux paths being created in adjacent flux concentrators 852 at slightly delayed intervals.

In an exemplary embodiment wherein transverse flux machine 800 operates as a generator, as rotor 850 moves from a first position to a second position relative to stator assembly 810, flux flows in an opposite direction within stator assembly 810, as compared to the first (prior) position of rotor 850. The change in flux direction in stator assembly 810 causes the flux to be conducted around coil 820 in alternating directions. The alternating flux direction results in generation of alternating electrical output in coil 820.

In various exemplary embodiments, rotor 850 is driven to rotate. Rotor 850 movement may be controlled by a control system which controls, for example, rotor RPM, axial positioning, acceleration, rotational direction, deceleration, starting, and/or stopping. In an exemplary embodiment, rotor 850 is driven in either rotational direction (clockwise or counterclockwise), for example depending on a preference of an operator and/or according to programming. The control system may further comprise programming memory, and a user interface, which may include graphics. The control system may include ports for coupling to additional electrical devices and/or may be coupled to additional electrical devices wirelessly. The control system may further comprise sensors for monitoring and measuring desired values of the system. These values may include one or more of phase matching, phase propagation, input waveforms, output waveforms, flux density, voltage constant, torque constant, webers of flux switched, RPM, amperes of current, wattage, system malfunctions, and/or the like. A power source may be coupled to the control system. This power source may be any suitable power source for operation of the control system, such as alternating current, direct current, capacitive charge, and/or inductance. In an exemplary embodiment, the power source is a DC battery.

Portions of rotor 850 and/or stator assembly 810 may comprise any suitable flux conducting material and/or materials, such as steel, silicon steel, amorphous metals, metallic glass alloys, powdered metals such as powdered iron, and/or the like. In an exemplary embodiment, portions of transverse flux machine 800, such as portions of stator assembly 810 and/or rotor 850, may be comprised of Metglas® brand amorphous metal products produced by Hitachi Metals America, for example Metglas® brand magnetic alloy 2605SA1 and/or the like. Moreover, portions of stator assembly 810 and/or rotor 850 may comprise nickel-iron alloys, for example "Carpenter 49" material manufactured by Carpenter Technology Corporation, and/or the like. Additionally, portions of stator assembly 810 and/or rotor 850 may comprise cobalt-iron alloys, for example "Hiperco 50" material manufactured by Carpenter Technology Corporation, and/or the like. Yet further, portions of stator assembly 810 and/or rotor 850 may comprise powdered metal and/or other soft magnetic composite materials. In general, portions of stator assembly 810 and/or rotor 850 may comprise any suitable material or materials having a desired electrical resistivity and/or magnetic permeability.

In an exemplary embodiment, portions of transverse flux machine 800, such as portions of magnets 854, may comprise permanent magnets, for example rare earth magnets. The magnetic material may comprise any suitable material, for example neodymium-iron-boron (NIB) material. In an exemplary embodiment, the rare earth permanent magnets have a suitable magnetic field, for example a field in the range of about 0.5 Tesla to about 2.5 Tesla.

In other exemplary embodiments, magnets 854 may comprise ceramic magnets, for example hard ferrites comprising iron and barium or strontium oxides. In an exemplary embodiment, magnets 854 may comprise FB9N-class material (SrO6Fe2O3) manufactured by TDK Corporation. In an exemplary embodiment, the ceramic magnets have a suitable magnetic field, for example a field in the range of about 0.1 Tesla to about 0.35 Tesla. In other exemplary embodiments, magnets 854 comprise inducted magnets and/or electromagnets. The inducted magnets and/or electromagnets may be made out of iron, iron alloys, metallic alloys, and/or the like, as well as other suitable materials as is known.

In various exemplary embodiments, teeth 816 are configured to reduce flux leakage in transverse flux machine 800. For example, in an exemplary embodiment teeth 816 taper towards one end in order to maintain a desired separation distance between teeth 816 in stator half 810-1 and teeth 816 in stator half 810-2. In this manner, more teeth 816 may be placed in transverse flux machine 800 while maintaining a desired minimum separation distance between teeth 816. In contrast, if teeth 816 were configured as generally non-tapering, rectangular structures, then the outer corners of adjacent teeth 816 would be closer to one another, increasing flux leakage therebetween.

In an exemplary embodiment, tooth 816 spans a distance $L_T$ from side S1 of stator assembly 810 to less than side S2 of stator assembly 810. In another exemplary embodiment, tooth 816 spans a distance $L_T$ from side S2 of stator assembly 810 to less than side S1 of stator assembly 810. In some exemplary embodiments, at least one tooth 816 spans distance $D_S$ from side S1 to side S2 of stator assembly 810.

In various exemplary embodiments, distance $L_T$ may be selected based on a number of poles in transverse flux machine 800. Stated generally, distance $L_T$ may vary in an inverse relationship with the number of poles in transverse flux machine 800. Moreover, teeth 816 in stator half 810-1 may be configured with a first distance $L_T$, and teeth 816 in stator half 810-2 may be configured with a second distance $L_T$. First distance $L_T$ and second distance $L_T$ may be the same, or they may differ from one another.

In an exemplary embodiment, tooth 816 spans distance $L_T$, where distance $L_T$ is at least 20 mm. In various exemplary embodiments tooth 816 spans distance $L_T$, where distance $L_T$ is between about 5 mm and about 50 mm. In other exemplary embodiments, tooth 816 spans distance $L_T$, where distance $L_T$ is between about 4 mm and about 10 cm. Moreover, tooth 816 may span any suitable distance $L_T$. In various exemplary embodiments, tooth 816 may extend from one side of stator assembly 810 to about the middle of stator assembly 810. In these embodiments, stator assembly 810 may be understood to be configured with a stator tooth overlap of about 0%. "0% overlap" may also be understood to mean alternating teeth 816 extending from the side of stator assembly 810 to a position other than about the middle of stator assembly 810, provided teeth 816 originating on side S1 of stator assembly 810 extend to about the same location as teeth 816 originating on the opposing side (e.g., side S2) of stator assembly 810. Moreover, stator assembly 810 may be configured with any suitable amount of stator tooth overlap, as desired. Additional details regarding stator tooth overlap are disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

In various exemplary embodiments, tooth 816 decreases in thickness (e.g., tapers and/or otherwise varies in one or more dimensions) as tooth 816 extends from one side of stator assembly 810 toward the other side of stator assembly 810. In an exemplary embodiment, tooth 816 is configured with a substantially constant thickness where tooth 816 contacts lamination stack 814, and with a varying thickness (e.g., taper) in the area where tooth 816 extends beyond the edge of lamination stack 814. In other exemplary embodiments, tooth 816 is configured with a constant thickness as tooth 816 extends from one side of stator assembly 810 toward another side of stator assembly 810.

In an exemplary embodiment, the size of the distance of the air gap between stator assembly 810 and rotor 850 is substantially constant across switching surface 816S. In an alternative embodiment, the size of the air gap between stator assembly 810 and rotor 850 may be variable over switching surface 816S.

In various exemplary embodiments, tooth 816 is configured to facilitate flow of flux in one or more directions, including a radial direction, a rotational direction, and/or an axial direction in transverse flux machine 800. In contrast, lamination stacks 814 are configured to facilitate flow of flux generally in a radial direction (and/or to a lesser degree, a rotational direction). Moreover, back return laminations 818 are configured to facilitate flow of flux generally in an axial direction (and/or to a lesser degree, a radial direction).

Figure 8D:
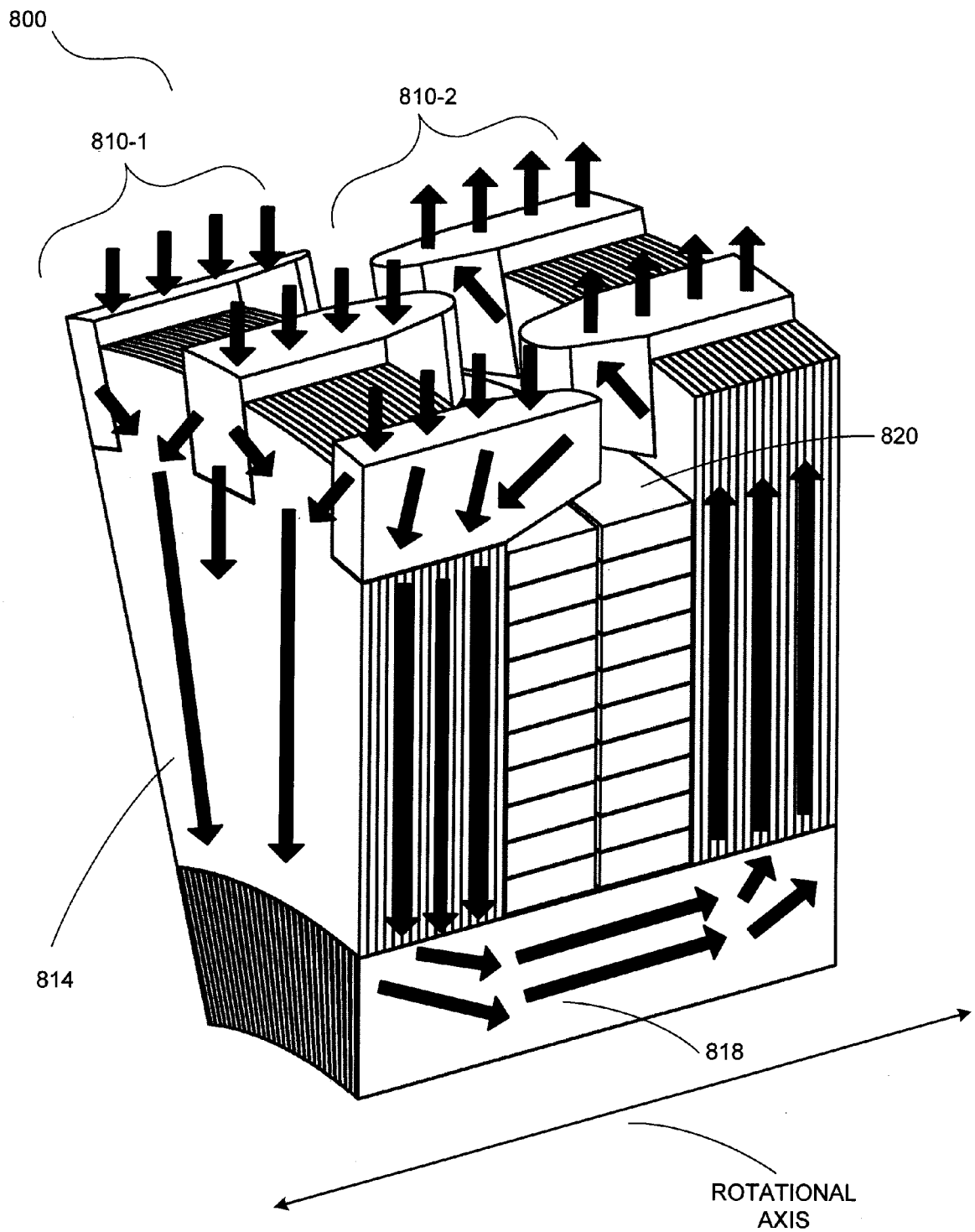
FIGS. 8D and 8E illustrate flux flow in an exemplary transverse flux machine in accordance with an exemplary embodiment.
Figure 8E:
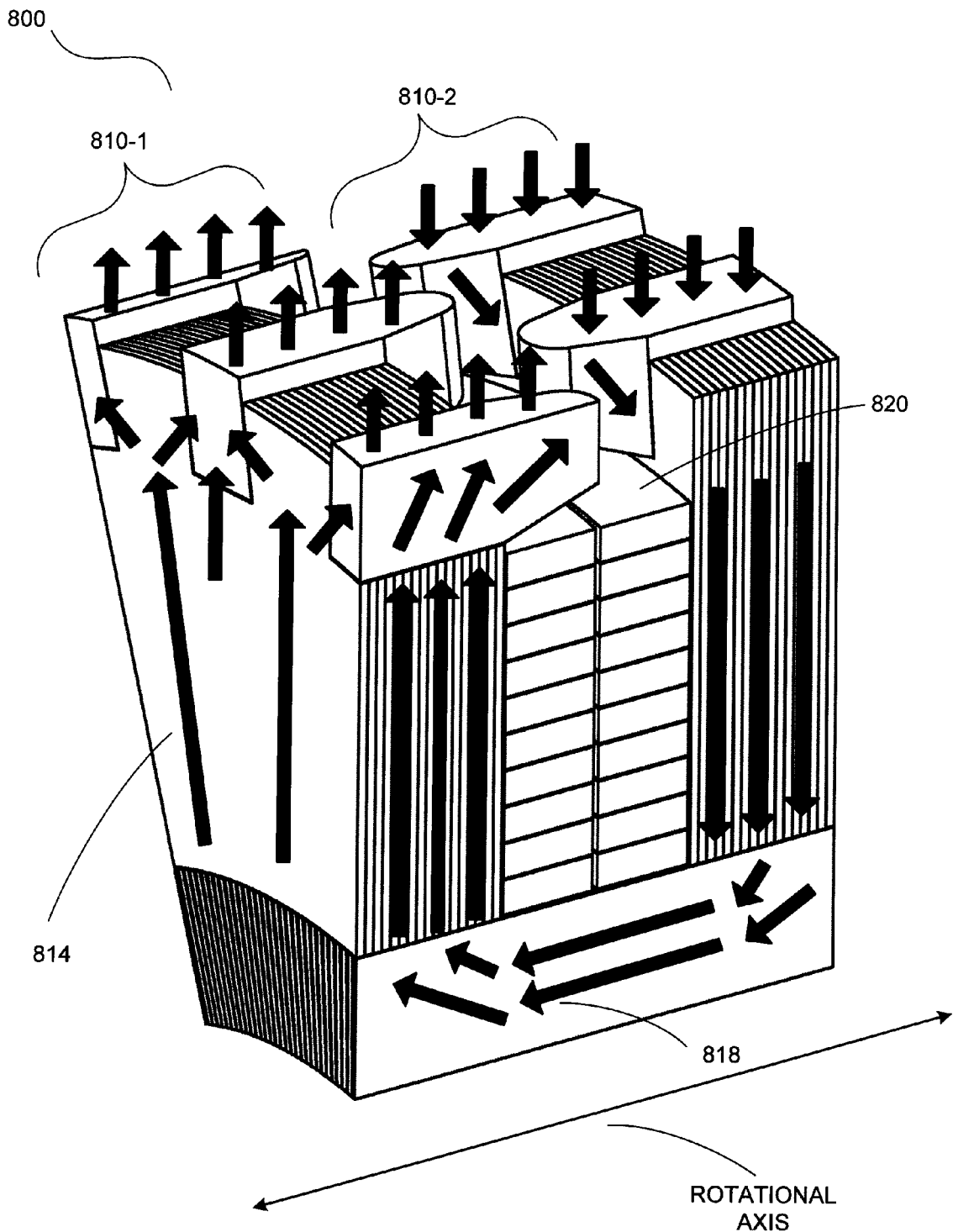

With additional reference now to FIGS. 8B and 8D, in various exemplary embodiments, in a first position of rotor 850, teeth 816-1 of stator half 810-1 receive flux via their respective switching surfaces 816S-1, and concentrate and distribute the flux across the side laminations of one or more lamination stacks 814. Similarly, teeth 816-2 of stator half 810-2 receive flux from the side laminations of one or more lamination stacks 814, and transfer flux to rotor 850 via their respective switching surfaces 816S-2. With additional reference now to FIG. 8E, in a second position of rotor 850, the direction of flux is generally reversed within transverse flux machine 800. In this manner, flux may be repeatedly switched at least partly around coil 820, for example as rotor 850 alternates between a first position and a second position.

In various exemplary embodiments, tooth 816 may be configured to act as a flux concentrator, increasing the amount of flux switched across switching surface 816S when compared to other materials and/or configurations. For example, in an exemplary embodiment, tooth 816 generally switches more flux across an air gap in a transverse flux machine than an alternative approach wherein portions of lamination stack 814 are extended to form a switch having similar area to switching surface 816S.

Figure 9A:
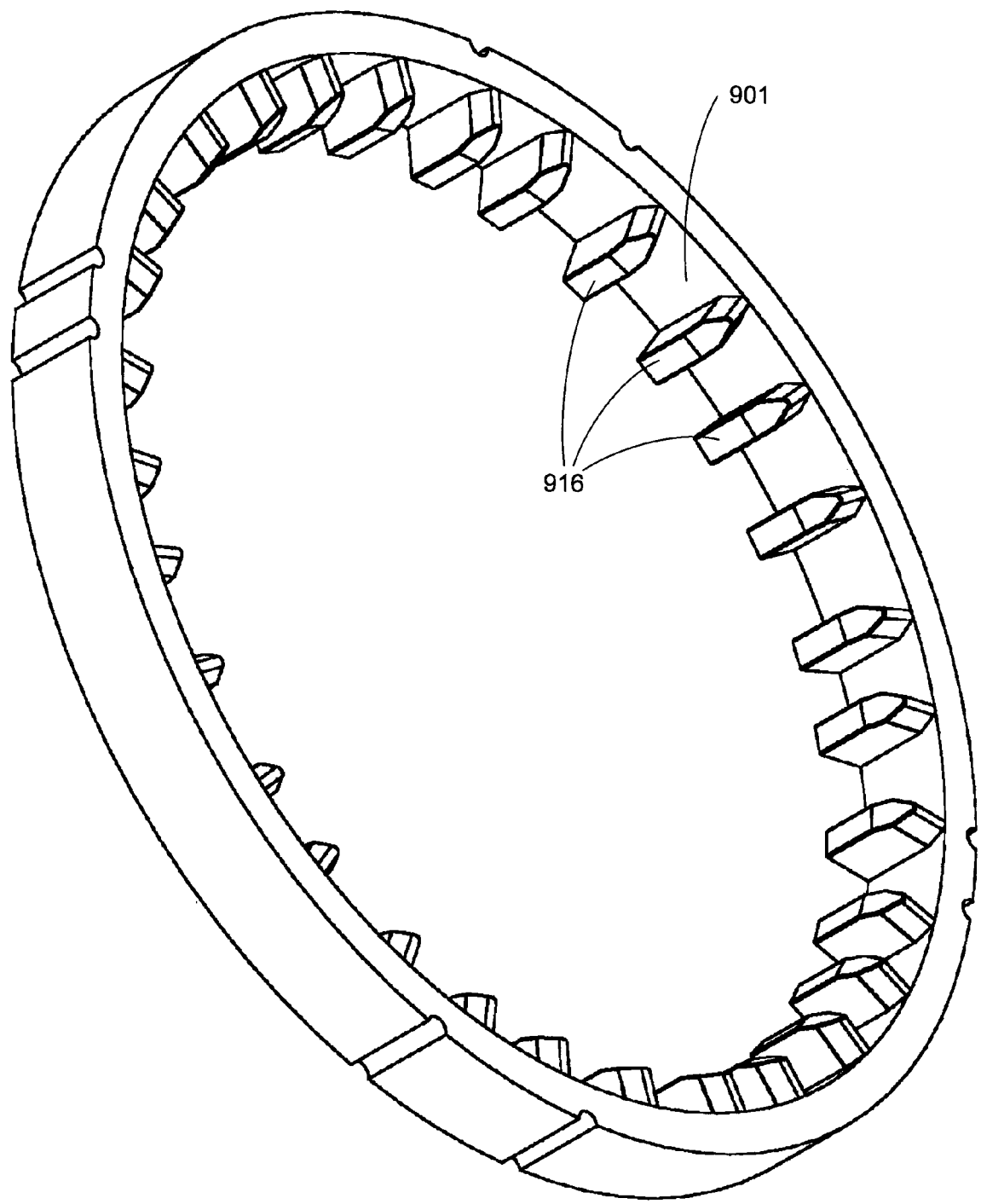
FIG. 9A illustrates teeth disposed on a ring in accordance with an exemplary embodiment.
Figure 9B:
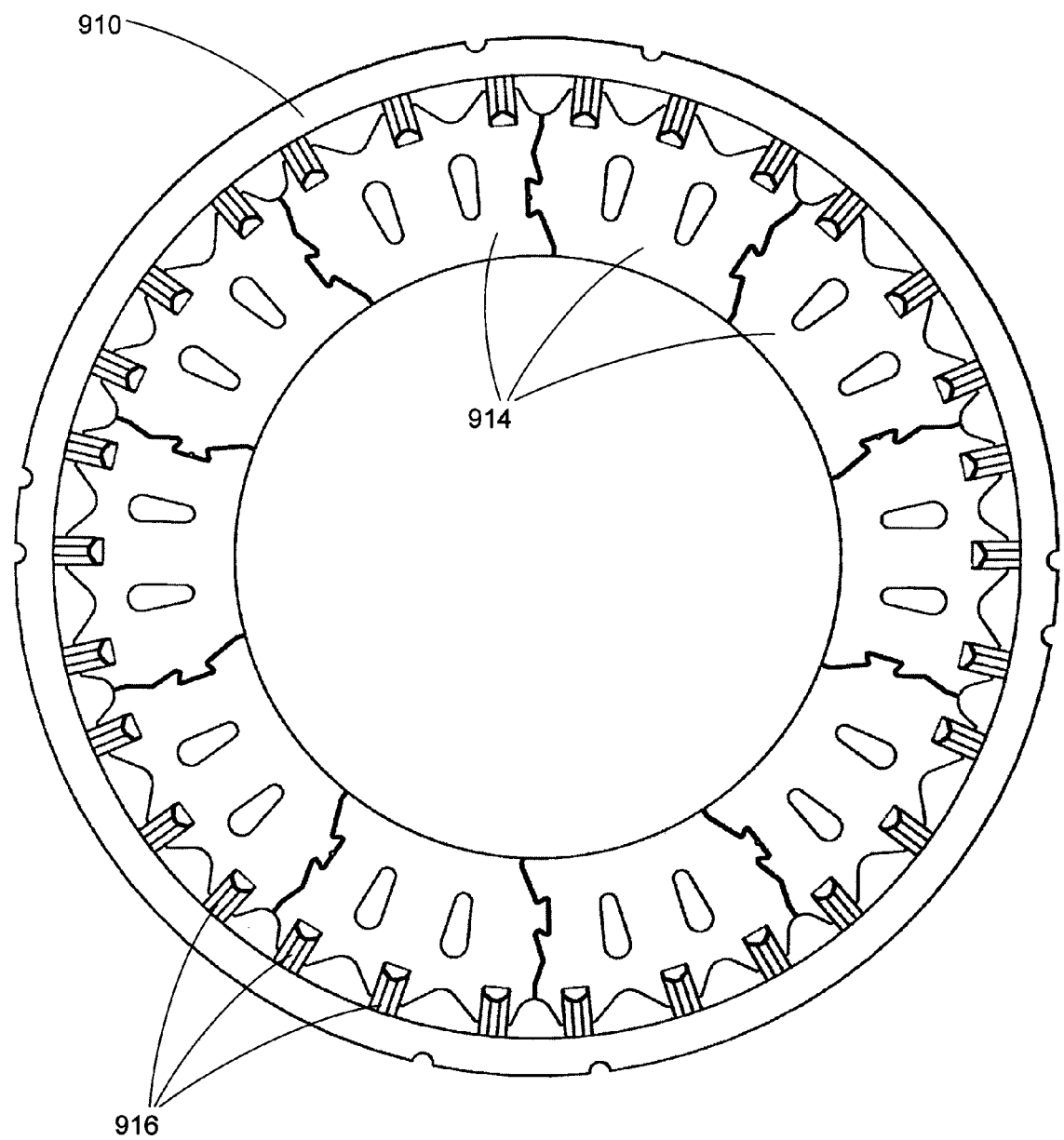
FIG. 9B illustrates lamination stacks placed within the ring of FIG. 9A in accordance with an exemplary embodiment.
Figure 9C:
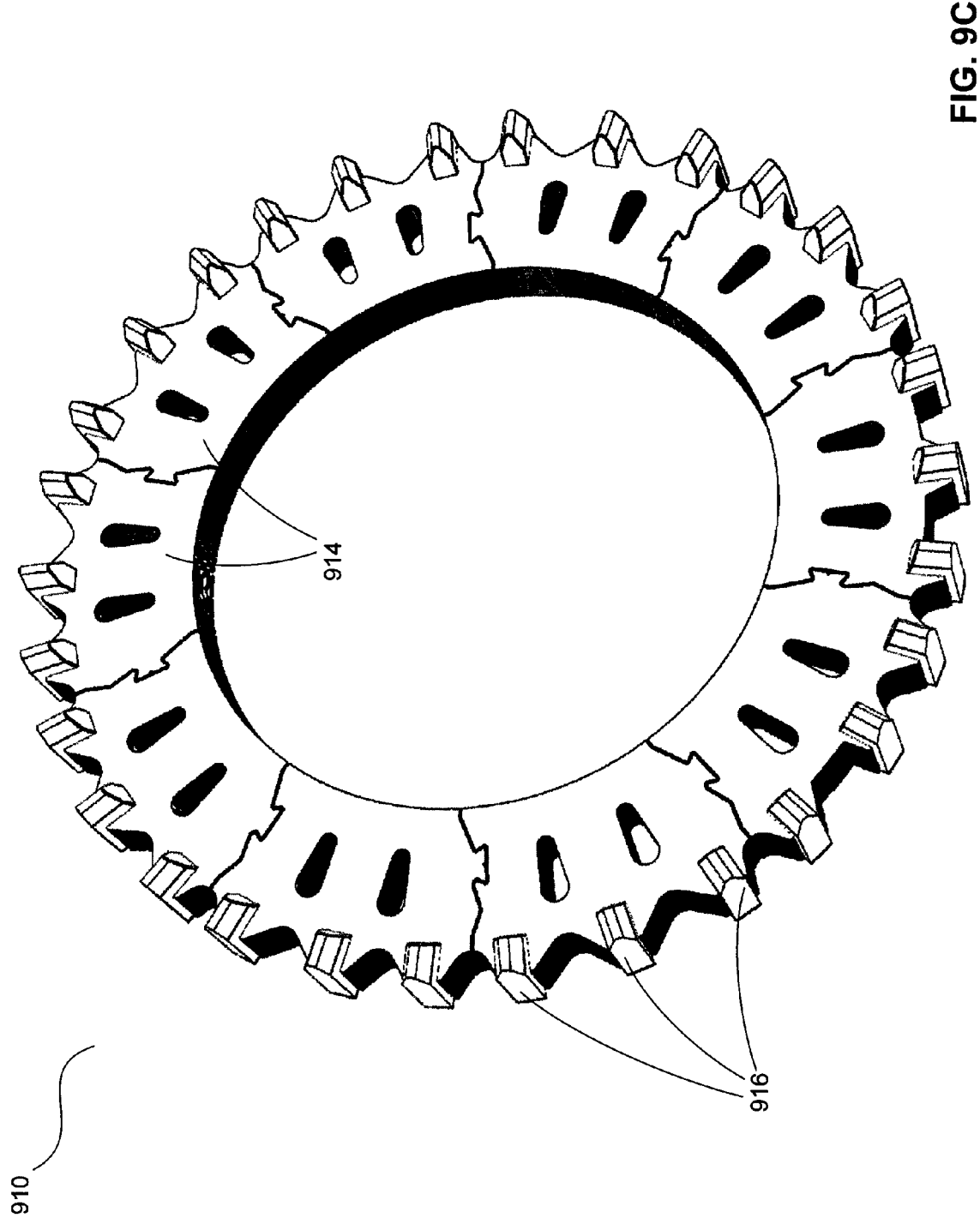
FIG. 9C illustrates lamination stacks and teeth coupled to form a stator half in accordance with an exemplary embodiment.

In accordance with principles of the present disclosure, components for transverse flux machines and/or commutated flux machines, including components forming a stator half (e.g., stator half, 710-1, 810-1, and/or the like) may be manufactured in a variety of ways. Turning now to FIGS. 9A-9C, in various exemplary embodiments, a ring 901 may be coupled to and/or integrally formed with one or more teeth 916 radiating towards the center of ring 901. In other exemplary embodiments, a ring 901 may be coupled to and/or integrally formed with one or more teeth 916 radiating outwardly therefrom. In an exemplary embodiment, ring 901 and teeth 916 are formed of powdered metal. In another exemplary embodiment, ring 901 comprises a plastic material having trenches configured for receiving one or more teeth 916 therein. Moreover, ring 901 may comprise composite materials, plastics, polymers, metals, and or the like, in order to facilitate positioning and/or retaining one or more teeth 916 and/or constructing a stator half. In certain exemplary embodiments, ring 901 comprises a material having a high dimensional tolerance, for example a tolerance of about +/−0.05 mm. In these exemplary embodiments, ring 901 may be utilized to precisely "time" teeth 916 within a transverse flux machine and/or commutated flux machine, for example in order to implement a sixth phase offset.

In an exemplary embodiment, ring 901 is coupled to 30 teeth 916. In another exemplary embodiment, ring 901 is integrally formed with 30 teeth 916. Moreover, more or fewer teeth 916 may be utilized, for example depending on a desired number of poles in a transverse flux machine and/or commutated flux machine.

In an exemplary embodiment, teeth 916 are distributed evenly around ring 901. In other exemplary embodiments, teeth 916 are distributed unevenly around ring 901, for example in order to implement a sixth phase offset or other desired phase offset.

Once teeth 916 are coupled to ring 901, lamination stacks 914 are placed inside ring 901. Teeth 916 slide into trenches on lamination stacks 914. Lamination stacks 914 may also interlock with one another. Epoxy or other suitable adhesive and/or structural material may be applied, infused, and/or otherwise utilized in order to secure teeth 916 to lamination stacks 914, and to secure lamination stacks 914 with respect to one another. In an exemplary embodiment, lamination stacks 914 and teeth 916 are coupled via a two part epoxy, for example Rhino brand 1310L-6 resin and 3138 hardener. Moreover, any suitable adhesive, structural material, and/or bonding agent may be utilized.

Once teeth 916 and lamination stacks 914 are secured with respect to one another, ring 901 may be removed, for example by cutting, grinding, machining, or other suitable process or method. The process of removing ring 901 may also be utilized to configure, shape, and/or prepare switching surfaces on teeth 916, for example by controlling the height to which teeth 916 extend beyond the edge of trenches in lamination stacks 914.

In other exemplary embodiments, one or more teeth 916 may be secured to a lamination stack 914. Subsequently, multiple lamination stacks 914 having teeth 916 therein may be linked together to form a stator half.

Figure 9E:
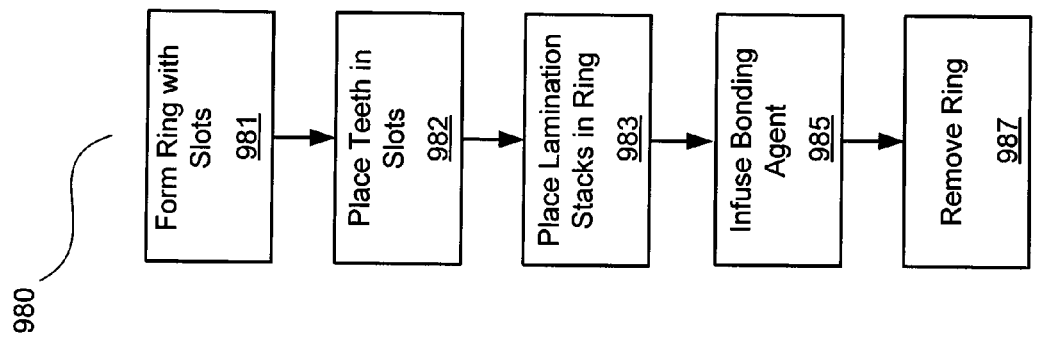
FIGS. 9D-9E illustrate block diagrams of methods of forming a stator half in accordance with an exemplary embodiment.
Figure 9D:
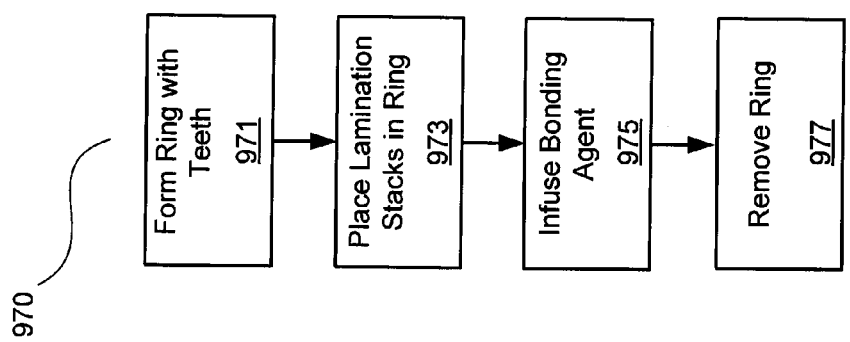

With reference now to FIGS. 9D and 9E, in an exemplary embodiment a method 970 for constructing a stator half comprises forming a ring with teeth thereon (step 971), placing a lamination stack in the ring (step 973), infusing a bonding agent to couple the lamination stack to a tooth (step 975), and removing the ring (step 977).

In another exemplary embodiment, a method 980 for constructing a stator half comprises forming a ring with slots therein (step 981), placing teeth in the slots (step 982), placing a lamination stack in the ring (step 983), infusing a bonding agent to couple the lamination stack to a tooth (step 985), and removing the ring (step 987).

Figure 10A:
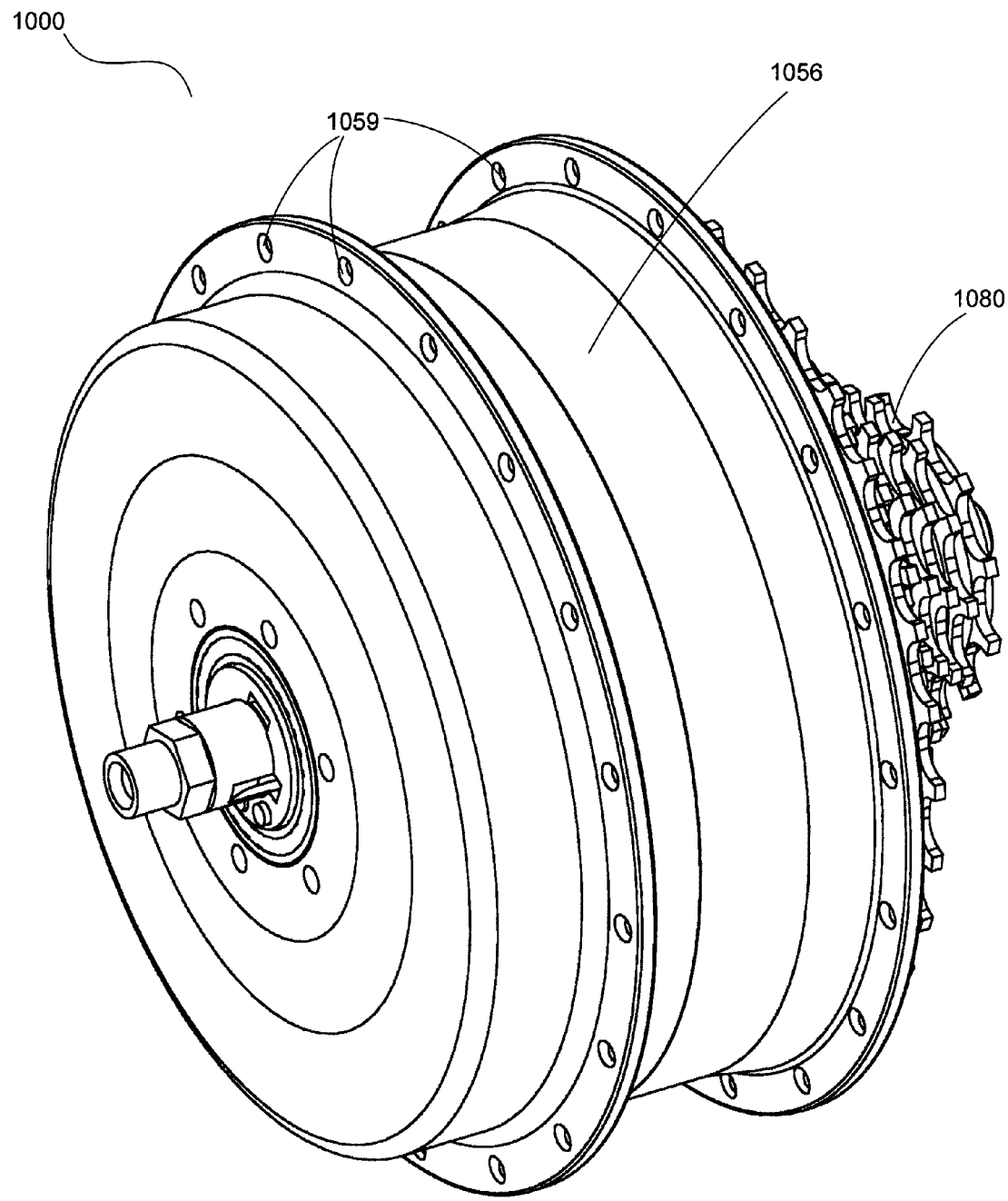
FIG. 10A illustrates an exemplary polyphase transverse flux machine configured as a bicycle motor in accordance with an exemplary embodiment.
Figure 10B:
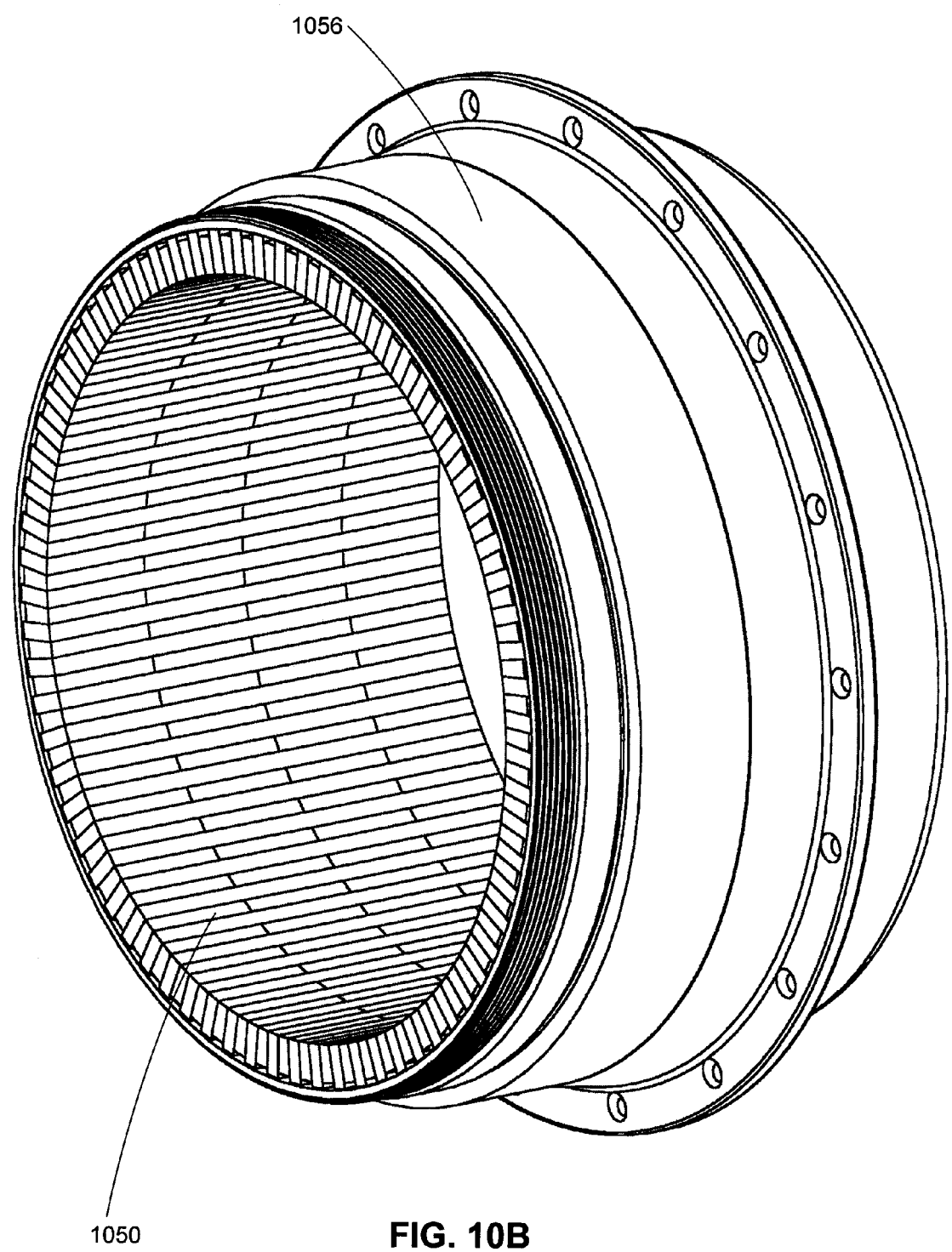
FIG. 10B illustrates a rotor and housing for a transverse flux machine in accordance with an exemplary embodiment.
Figure 10C:
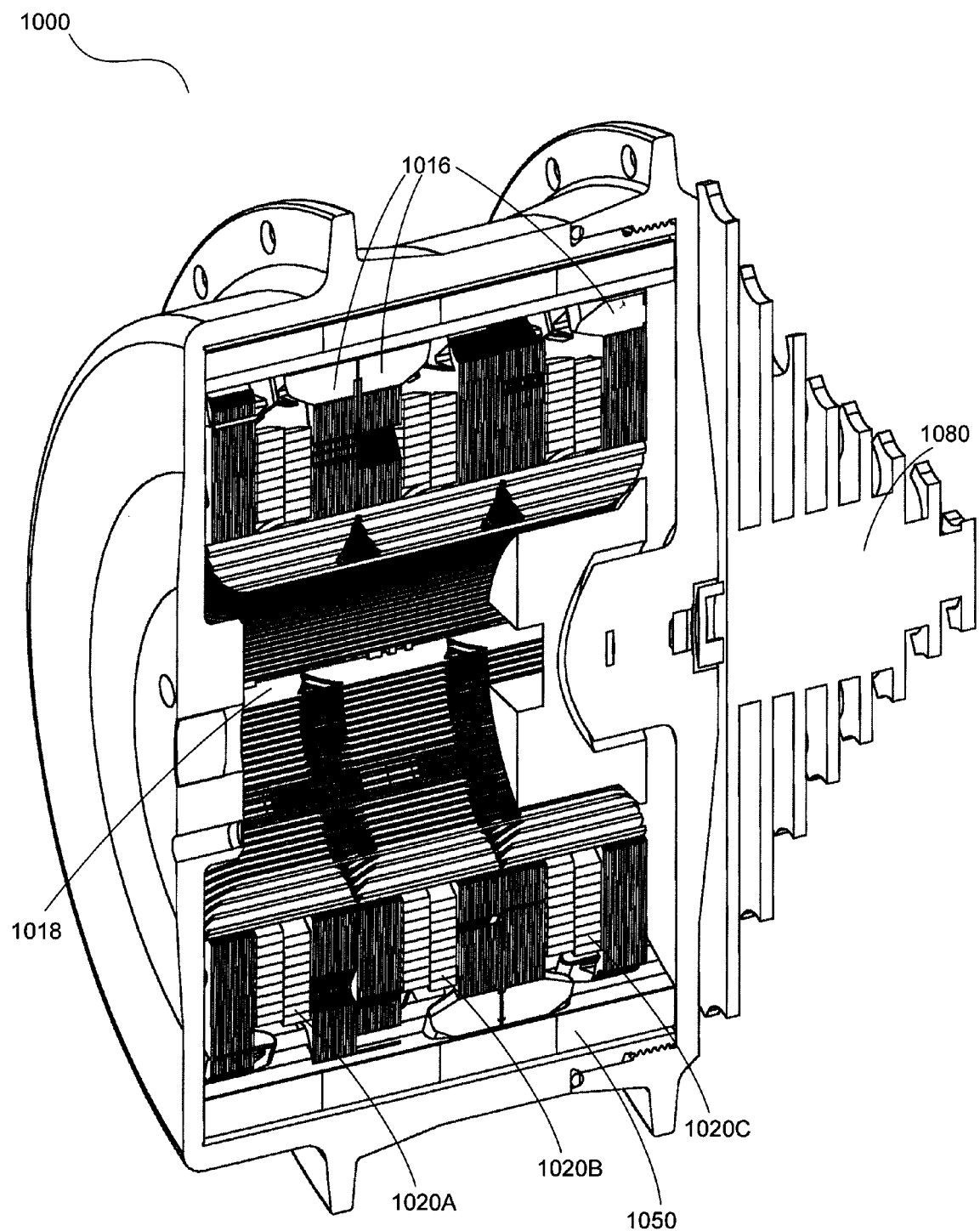
FIG. 10C illustrates a cut-away view of an exemplary polyphase transverse flux machine configured as a bicycle motor in accordance with an exemplary embodiment.

In various exemplary embodiments, with reference now to FIGS. 10A-10C, transverse flux machines and/or commutated flux machines configured in accordance with principles of the present disclosure may be utilized as motors for light electric vehicles, for example as motors for electric bicycles.

In an exemplary embodiment, transverse flux machine 1000 may be generally configured with an outer form factor at least partially defined by rotor body 1056. Transverse flux machine 1000 may be coupled to a wheel, for example a bicycle wheel, via a plurality of spoke holes 1059. Transverse flux machine 1000 may also be coupled to gear cassette 1080 and/or other suitable components in order to allow transverse flux machine 1000 to interface with various driveline and/or control components of a bicycle or other LEV (e.g., brake calipers, foot pedals, chains, belts, and/or the like).

In various exemplary embodiments, transverse flux machine 1000 is configured to be located in the same location as and/or replace the hub of a wheel, such as an e-bike wheel. Stated another way, in certain exemplary embodiments transverse flux machine 1000 may be no wider along the axis of rotation than an available distance in a wheel, for example the distance between gear cassette 1080 and a brake disc of a bicycle. Moreover, in many exemplary embodiments transverse flux machine 100 may be configured to be lightweight, for example having a total mass of less than about 5 kilograms including all structural, mechanical, electrical, and magnetic components. Additionally, transverse flux machine 1000 may be configured to be compact, for example having a volume less than 2,000 cubic centimeters (cc), less than 1000 cc, and/or less than 750 cc. Yet further, transverse flux machine 1000 may be configured to utilize a suitable mass of active electrical and/or magnetic components, for example between about 3.3 kilograms and about 4 kilograms of active electrical and/or magnetic components.

In various exemplary embodiments, transverse flux machine 1000 may provide a continuous, thermally stable output torque of about 5 Newton-meters to about 30 Newton-meters, and a peak output torque of about 10 Newton-meters to about 100 Newton-meters. Yet further, transverse flux machine 1000 may be operative at a high efficiency, for example an efficiency above 90%, over a particular output torque range, for example between an output torque of about 15 Newton-meters to about 45 Newton-meters, and/or over a particular RPM range, for example between about 25 RPM and about 300 RPM. Stated generally, transverse flux machine 1000 may be more compact, torque dense, efficient, and/or powerful than various prior electrical machines, particularly electrical machines of a similar size and/or mass.

In various exemplary embodiments, transverse flux machine 1000 may be configured with various sensors, including torque sensors, strain gauges, Hall effect sensors, temperature sensors, and/or the like, in order to facilitate operation and/or characterization and assessment of transverse flux machine 1000. Additional details regarding utilization of transverse flux machines and/or commutated flux machines in electric bicycles and other light electric vehicles are disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

In accordance with principles of the present disclosure, a transverse flux machine and/or commutated flux machine may desirably be utilized to provide mechanical output to robotic devices, prosthetic limbs, powered exoskeletons, industrial equipment, and/or the like. Moreover, a transverse flux machine and/or commutated flux machine may desirably be utilized to provide mechanical output to relatively lightweight vehicles such as bicycles, scooters, motorcycles, quads, golf carts, or other vehicles. Yet further, a transverse flux machine and/or commutated flux machine may desirably be utilized to power an automobile, a truck, bus, or other passenger vehicle. Additionally, a transverse flux machine and/or commutated flux machine may desirably be utilized in small engine applications, for example portable generators, power tools, and other electrical equipment. A transverse flux machine and/or commutated flux machine may also desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. Yet further, a transverse flux machine and/or commutated flux machine may also be desirably utilized in large-scale power generation applications, for example in fixed installations providing 10 Kw or more of electrical power. In general, transverse flux machines and/or commutated flux machines may be utilized to provide electrical and/or mechanical input and/or output to and/or from any suitable devices.

Electrical machines configured in accordance with principles of the present disclosure, for example transverse flux machine 700, transverse flux machine 800 and/or transverse flux machine 1000, may be configured to operate at any suitable voltage and/or voltages. For example, in an exemplary embodiment, transverse flux machine 800 is configured to operate at a voltage of about 24 volts in coil 820. In another exemplary embodiment, transverse flux machine 800 is configured to operate at a voltage of about 48 volts in coil 820. In another exemplary embodiment, transverse flux machine 800 is configured to operate at a voltage of about 160 volts in coil 820. In another exemplary embodiment, transverse flux machine 800 is configured to operate at a voltage of about 600 volts in coil 820. Moreover, transverse flux machine 800 may be configured to operate at any suitable voltage and/or voltages, as desired.

Electrical machines configured in accordance with principles of the present disclosure, for example transverse flux machine 700, transverse flux machine 800 and/or transverse flux machine 1000, may be configured to operate in connection with any suitable controller and/or controllers. For example, in an exemplary embodiment, transverse flux machine 800 is configured to operate in connection with a pulse width modulation (PWM) controller. In various exemplary embodiments, transverse flux machine 800 is configured to operate in connection with a sinusoidal drive, a trapezoidal drive, and/or the like. Moreover, transverse flux machine 800 may be configured to operate in connection with field-oriented control, block commutation, and/or the like.

Figure 11A:
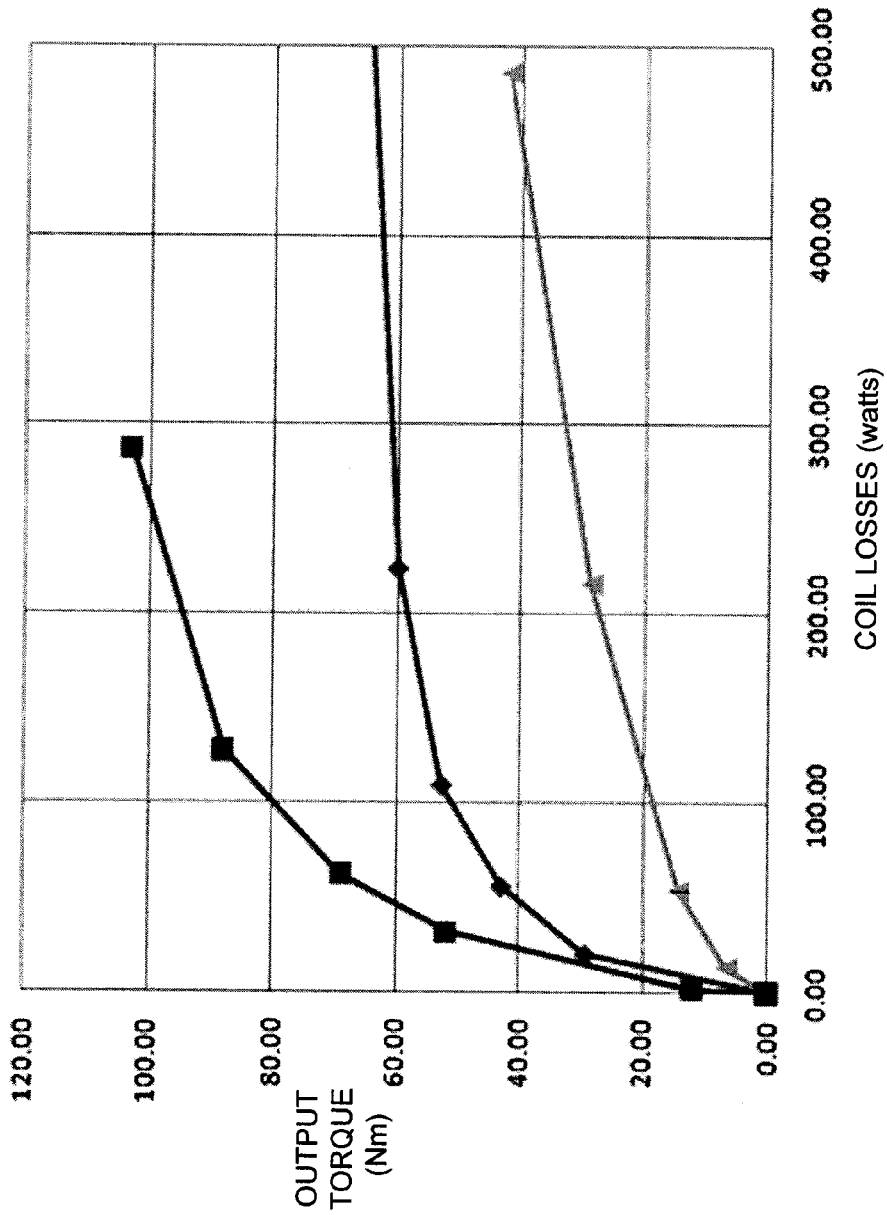
FIGS. 11A and 11B illustrate performance of various electrical machines, including polyphase transverse flux machines configured in accordance with an exemplary embodiment.
Figure 11B:
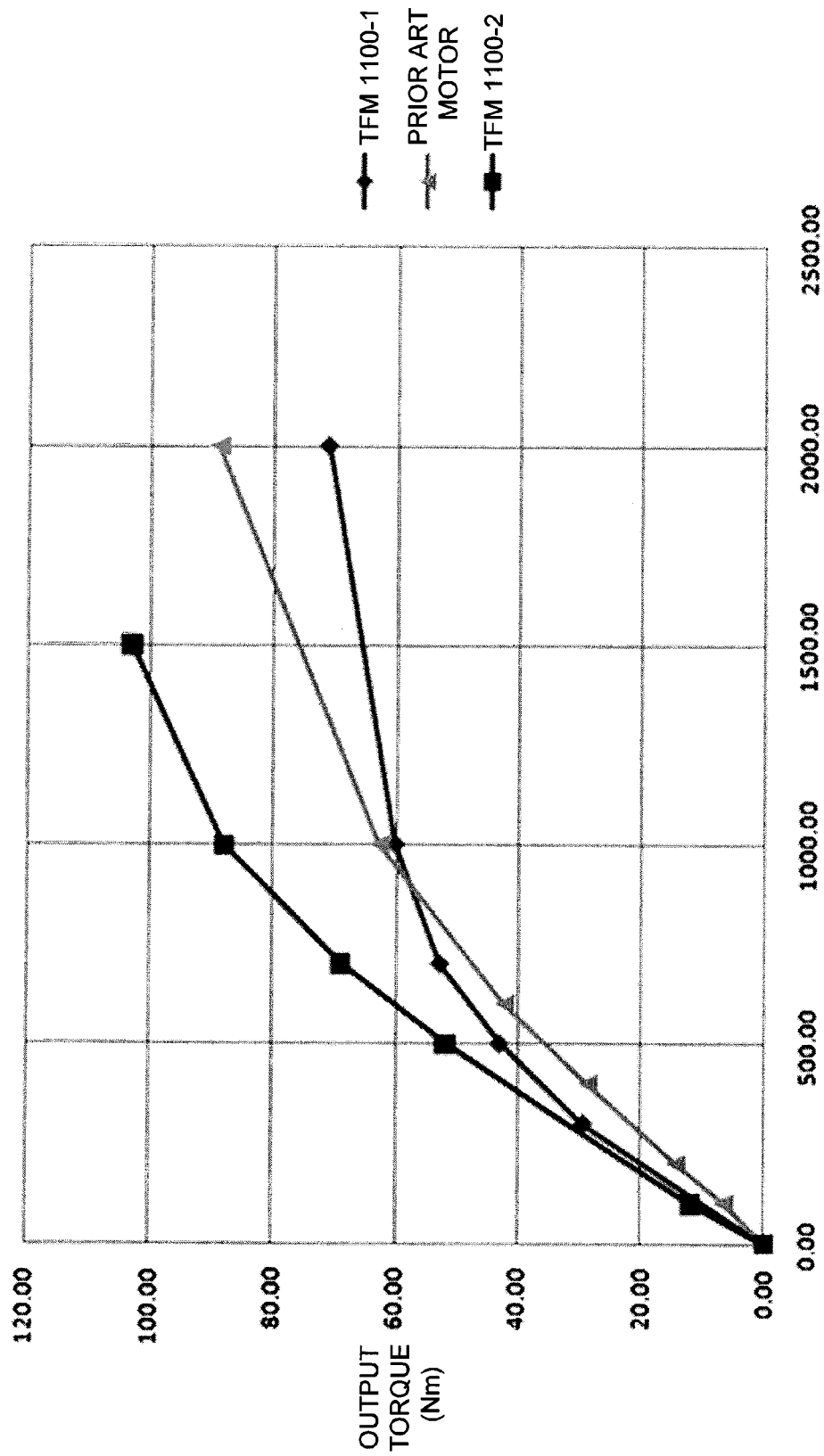

In accordance with various exemplary embodiments, turning now to FIGS. 11A and 11B, a polyphase transverse flux machine configured in accordance with principles of the present disclosure, for example transverse flux machine 1100 configured as a bicycle hub motor, may be configured with improved performance characteristics when compared to existing motors, such as prior art bicycle hub motors.

For example, with reference to FIG. 11A, a transverse flux machine (TFM) configured as a bicycle hub motor and configured in accordance with various principles of the present disclosure, for example transverse flux machine 1100-1 and/or transverse flux machine 1100-2, can achieve higher output torque at a similar level of resistive coil losses compared to a prior art motor. Stated another way, transverse flux machine 1100-1 and/or 1100-2 can achieve a similar level of output torque compared to a prior art motor while incurring lower resistive coil losses.

For example, a prior art bicycle motor achieves an output torque of about 15 Newton-meters while incurring resistive coil losses of about 50 watts. In contrast, TFM 1100-1 achieves an output torque of about 15 Newton-meters while incurring resistive coil losses of only about 12 watts. Moreover, TFM 1100-2 achieves an output torque of about 15 Newton-meters while incurring resistive coil losses of only about 4 watts. Because TFM 1100-1 and TFM 1100-2 incur lower resistive coil losses when operated at a similar level of output torque as a prior art motor, TFM 1100-1 and TFM 1100-2 operate at reduced temperatures.

Moreover, in various exemplary embodiments, TFM 1100-1 and TFM 1100-2 can offer torque output levels that a prior art motor simply cannot achieve. Moreover, TFM 1100-1 and 1100-2 may offer continuous, thermally stable output torque levels that exceed the peak torque achievable by a prior art motor. Continuing to reference FIG. 11A, the prior art motor is unable to generate output torque of beyond about 42 Newton-meters, and operation at this level of output torque results in massive resistive coil losses of more than 450 watts. Such large resistive coil losses will typically quickly result in thermal failure of the motor. In contrast, TFM 1100-1 achieves an output torque of about 42 Newton-meters while incurring resistive coil losses of about 60 watts. Yet further, TFM 1110-2 achieves an output torque of about 42 Newton-meters while incurring resistive coil losses of only about 22 watts.

Moreover, TFM 1100-2 achieves an output torque of about 60 Newton-meters while incurring resistive coil losses of about 50 watts. TFM 1100-2 is thermally stable at this level of resistive coil loss, and thus TFM 1100-2 may be configured with a continuous, thermally stable torque density exceeding the peak torque of a prior art bicycle hub motor.

As can be appreciated, utilizing an electric motor configured in accordance with principles of the present disclosure, for example TFM 1100-1 and/or TFM 1100-2 having the ability to produce higher torque at a given level of resistive coil losses compared to a prior art motor, allows an electric bicycle or LEV to travel further on a comparable battery charge, to climb a wider range of grades and engage headwinds more effectively, and to propel heavier riders and/or other loads.

Turning now to FIG. 11B, in various exemplary embodiments, TFM 1100-1 and TFM 1100-2 achieve higher output torque per amp-turn compared to a prior art motor. For example, when operated at about 100 amp-turns per coil, the prior art motor achieves about 7 Newton-meters of output torque. In contrast, when operated at about 100 amp-turns per coil, TFM 1100-1 achieves about 11 Newton-meters of output torque. Yet further, when operated at about 100 amp-turns per coil, TFM 1100-2 achieves about 14 Newton-meters of output torque.

Moreover, when operated at about 500 amp-turns per coil, the prior art motor achieves about 33 Newton-meters of output torque. In contrast, when operated at about 500 amp-turns per coil, TFM 1100-1 achieves about 43 Newton-meters of output torque. Yet further, when operated at about 500 amp-turns per coil, TFM 1100-2 achieves about 54 Newton-meters of output torque.

Because TFM 1100-1 and/or TFM 1100-2 achieve higher output torque per amp-turn compared to a prior art motor, TFM 1100-1 and/or TFM 1100-2 may operate at a higher continuous, thermally stable torque level as compared to the prior art motor.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET", the contents of which are hereby incorporated by reference in their entirety.

Principles of the present disclosure may also suitably be combined with principles of electrical isolation and/or segmentation in transverse flux machines and/or commutated flux machines as disclosed in U.S. patent application Ser. No. 13/291,373 entitled "TRANSVERSE AND/OR COMMUTATED FLUX SYSTEMS HAVING SEGMENTED STATOR LAMINATIONS" having the same filing date as the present application, the contents of which are hereby incorporated by reference in their entirety.

Principles of the present disclosure may also suitably be combined with principles of coils, including dual wound coils in transverse flux machines and/or commutated flux machines as disclosed in U.S. patent application Ser. No. 13/291,385 entitled "TRANSVERSE AND/OR COMMUTATED FLUX SYSTEM COIL CONCEPTS" having the same filing date as the present application, the contents of which are hereby incorporated by reference in their entirety.

Principles of the present disclosure may also suitably be combined with principles of isolated torque sensing systems as disclosed in U.S. Provisional Patent Application No. 61/453,000 filed Mar. 15, 2011 entitled "ISOLATED TORQUE SENSOR", the contents of which are hereby incorporated by reference in their entirety.

Principles of the present disclosure may also suitably be combined with principles of adjustable Hall effect sensor systems as disclosed in U.S. Provisional Patent Application No. 61/453,006 filed Mar. 15, 2011 and entitled "ADJUSTABLE HALL EFFECT SENSOR SYSTEM", the contents of which are hereby incorporated by reference in their entirety.

Moreover, principles of the present disclosure may suitably be combined with any number of principles disclosed in any one of and/or all of the U.S. patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, use of a torque sensor, use of an adjustable Hall effect sensor system, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrical machine, comprising:
   a rotor configured to rotate around an axis of rotation;
   a coil wound about the axis of rotation; and
   a stator comprising:
      a lamination stack coupled to a tooth,
      a first stator half, comprising
         a plurality of said lamination stacks with interlocking features forming a generally ring-shaped structure; and
         a plurality of teeth coupled to the generally ring-shaped structure,
   wherein, in a first position of the rotor, flux is transferred from the plurality of teeth to the rotor;
   wherein, in a second position of the rotor, flux is transferred from the rotor to the plurality of teeth;
   a back return lamination coupling the first stator half to a second stator half;
   wherein the lamination stack comprises silicon steel,
   wherein the tooth comprises powdered metal, and
   wherein the electrical machine is at least one of a transverse flux machine or a commutated flux machine.

2. The electrical machine of claim 1, wherein the tooth is configured with a dovetail shape to mechanically couple to the lamination stack.

3. The electrical machine of claim 1, wherein the lamination stack comprises a trench wherein the tooth is disposed.

4. The electric machine of claim 1, wherein the stator comprises a plurality of teeth on the outside of the generally ring-shaped structure.

5. The electrical machine of claim 1, wherein the rotor is face engaged with the stator.

6. The electrical machine of claim 1, wherein the lamination stack is configured with a groove having an hourglass shape, and wherein the groove is configured to mechanically retain a cured epoxy therein.

7. The electrical machine of claim 1, wherein the coil is configured with a resistance of less than about 0.1 ohm.

8. The electrical machine of claim 1, wherein the dimensions of the tooth are selected to cause at least a portion of the lamination stack to fully saturate with magnetic flux.

9. The electric-al machine of claim 1, wherein the tooth is tapered in order to reduce flux leakage.

10. The electrical machine of claim 1, wherein the stator comprises a plurality of teeth configured according to a sixth-phase offset.

11. The electrical machine of claim 1, wherein the electrical machine is a polyphase machine.

12. The electrical machine of claim 1, wherein the electrical machine is configured with a continuous, thermally stable torque density in excess of 30 Newton-meters per kilogram.

13. The electrical machine of claim 12, wherein the electrical machine is configured with a diameter of less than six inches.

14. The electrical machine of claim 1, wherein the electrical machine is configured to support a magnetic flux switching frequency in the electrical machine in excess of 1000 Hz.

15. An electrical machine, comprising
   a rotor configured to rotate around an axis of rotation;
   a coil wound about the axis of rotation; and
   a stator comprising a pair of lamination stacks, each coupled to an associated tooth, each lamination stack arranged on opposing axial sides of the coil, with a back return extending axially between the pair of lamination stacks;
   wherein each lamination stack comprises silicon steel,
   wherein each associated tooth comprises powdered metal, and
   wherein the electrical machine is at least one of a transverse flux machine or a commutated flux machine.

* * * * *